(12) United States Patent
Carnevali

(10) Patent No.: US 7,320,450 B2
(45) Date of Patent: Jan. 22, 2008

(54) CONFIGURABLE MOUNTING APPARATUS

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 0 days.

(21) Appl. No.: 10/883,536

(22) Filed: Jun. 30, 2004

(65) Prior Publication Data

US 2005/0092877 A1 May 5, 2005

(51) Int. Cl.
*F16M 13/00* (2006.01)
(52) U.S. Cl. .................... 248/160; 248/121; 248/122.1; 248/180.1; 248/181.1
(58) Field of Classification Search ............... 248/160, 248/181.1, 180.1, 534, 535, 159, 121, 122.1
See application file for complete search history.

(56) References Cited

U.S. PATENT DOCUMENTS

| | | | | |
|---|---|---|---|---|
| 1,735,949 A | * | 11/1929 | Brady ........................ 359/672 |
| 2,111,368 A | * | 3/1938 | Kron ........................... 248/160 |
| 2,112,995 A | * | 4/1938 | O'Keefe ........................ 248/50 |
| 2,459,711 A | * | 1/1949 | Meier ........................ 211/60.1 |
| 2,481,271 A | * | 9/1949 | Willey ........................ 379/455 |
| 2,597,670 A | * | 5/1952 | Pinto .......................... 379/447 |
| 4,607,772 A | | 8/1986 | Hancock |
| 4,842,174 A | * | 6/1989 | Sheppard et al. ........... 224/548 |
| 5,150,710 A | * | 9/1992 | Hall et al. ..................... 372/58 |
| 5,187,744 A | * | 2/1993 | Richter ....................... 379/449 |
| 5,845,885 A | | 12/1998 | Carnevali |
| 6,032,910 A | | 3/2000 | Richter |
| 6,170,598 B1 | * | 1/2001 | Furukawa ................... 180/334 |
| 6,561,476 B2 | * | 5/2003 | Carnevali .............. 248/288.31 |
| 6,585,212 B2 | | 7/2003 | Carnevali |
| 6,588,637 B2 | | 7/2003 | Gates et al. |
| 6,840,485 B2 | * | 1/2005 | Richter ....................... 248/311.2 |
| 7,011,279 B2 | * | 3/2006 | Richter ....................... 248/160 |
| 2004/0108348 A1 | | 6/2004 | Barnes |

* cited by examiner

*Primary Examiner*—Amy J. Sterling
(74) *Attorney, Agent, or Firm*—Charles J. Rupnick Attorney at Law

(57) ABSTRACT

A multiply configurable mounting apparatus having an elongated permanently bendable support leg with a support base coupled to a first end of the support leg, the support base being structured for securing the mounting apparatus relative to an external surface; and a mounting platform coupled to a second end of the support leg opposite from the first end, the mounting platform is structured for mounting an external device to the second end portion of the permanently bendable support leg.

13 Claims, 12 Drawing Sheets

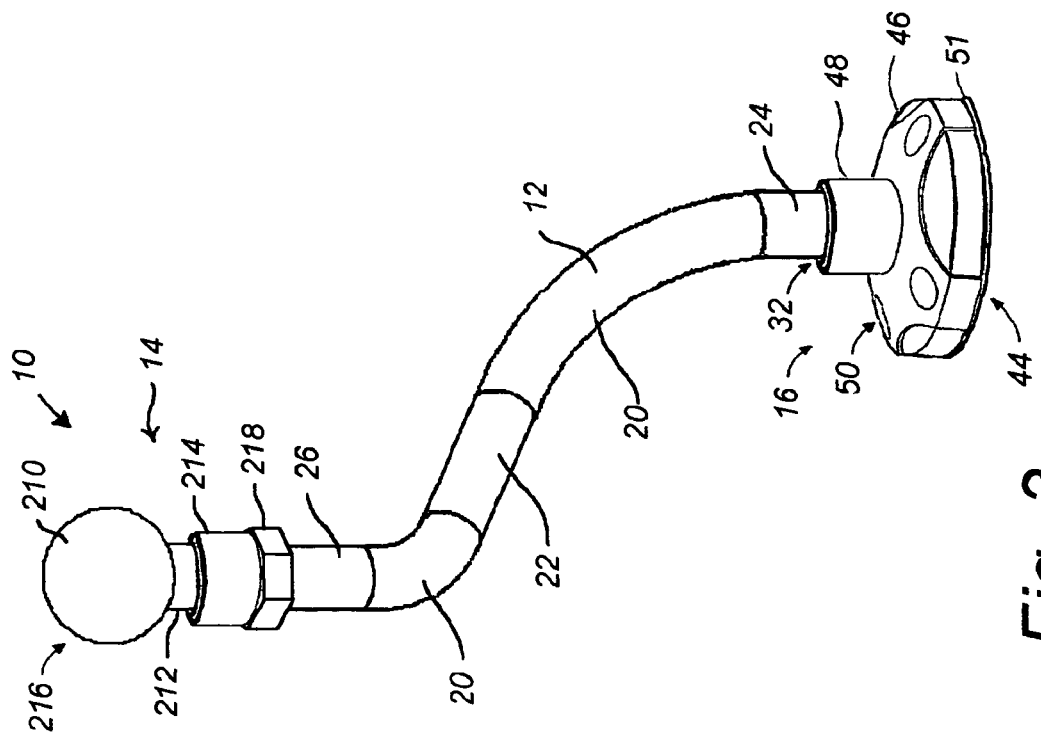
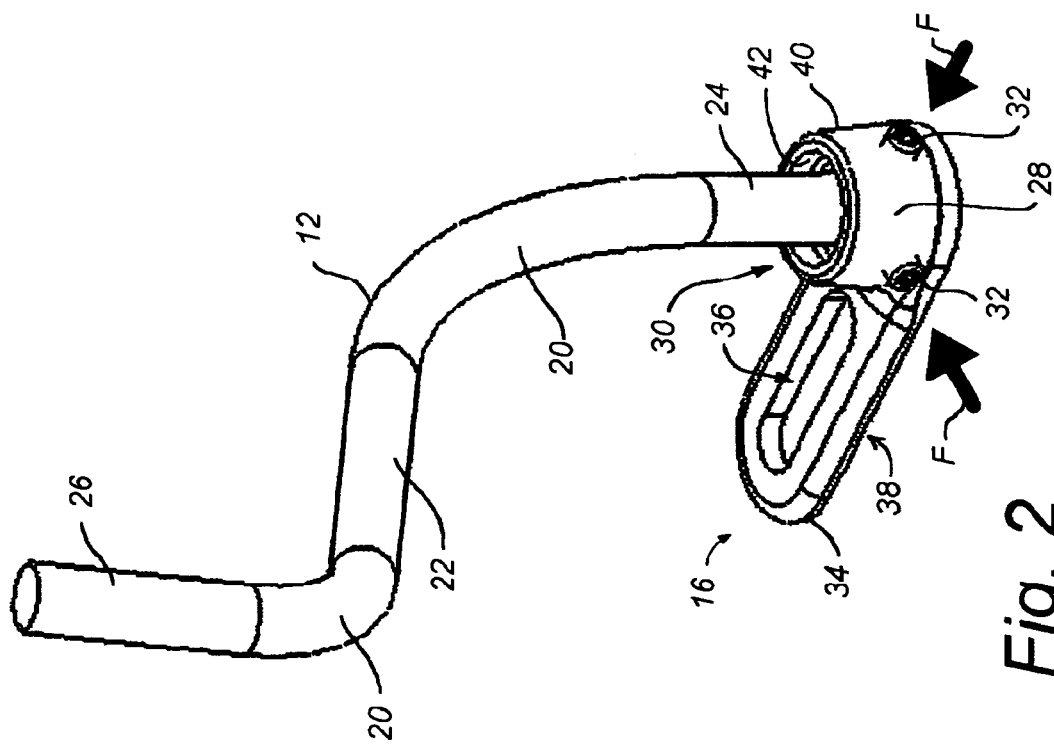

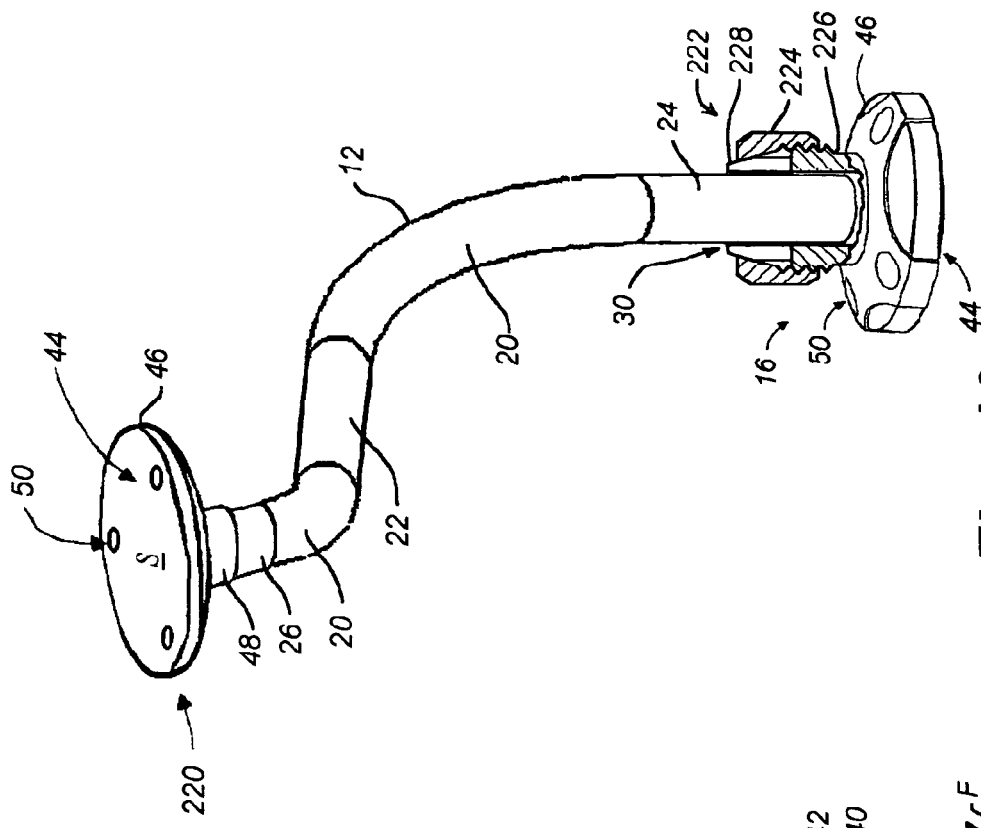
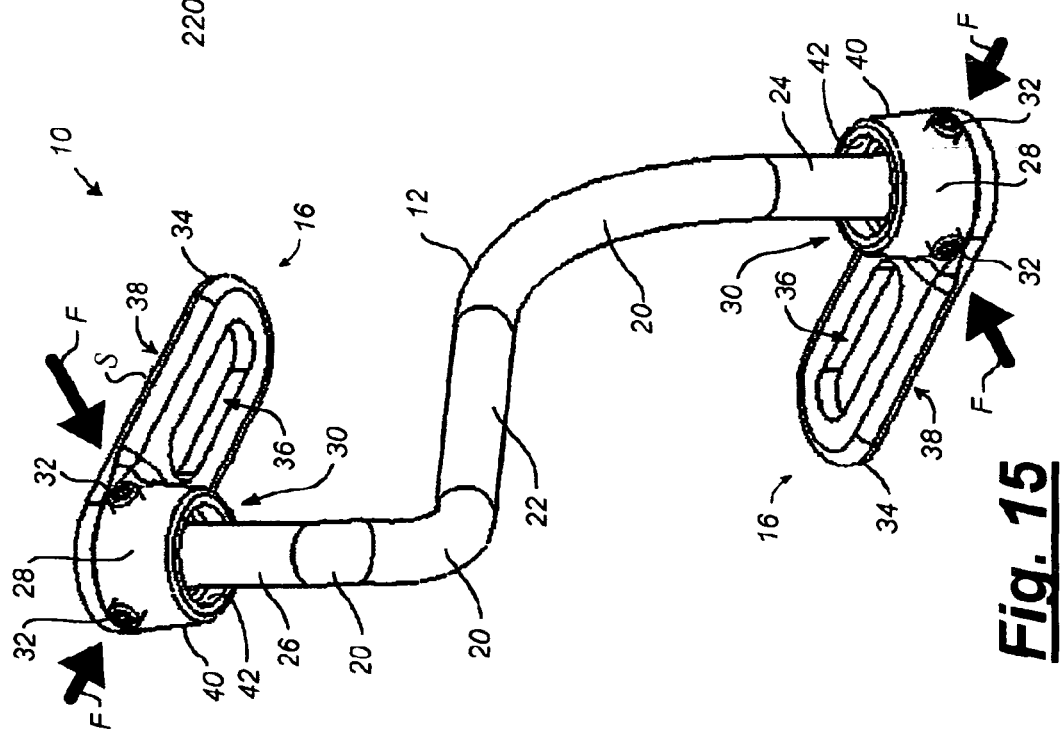

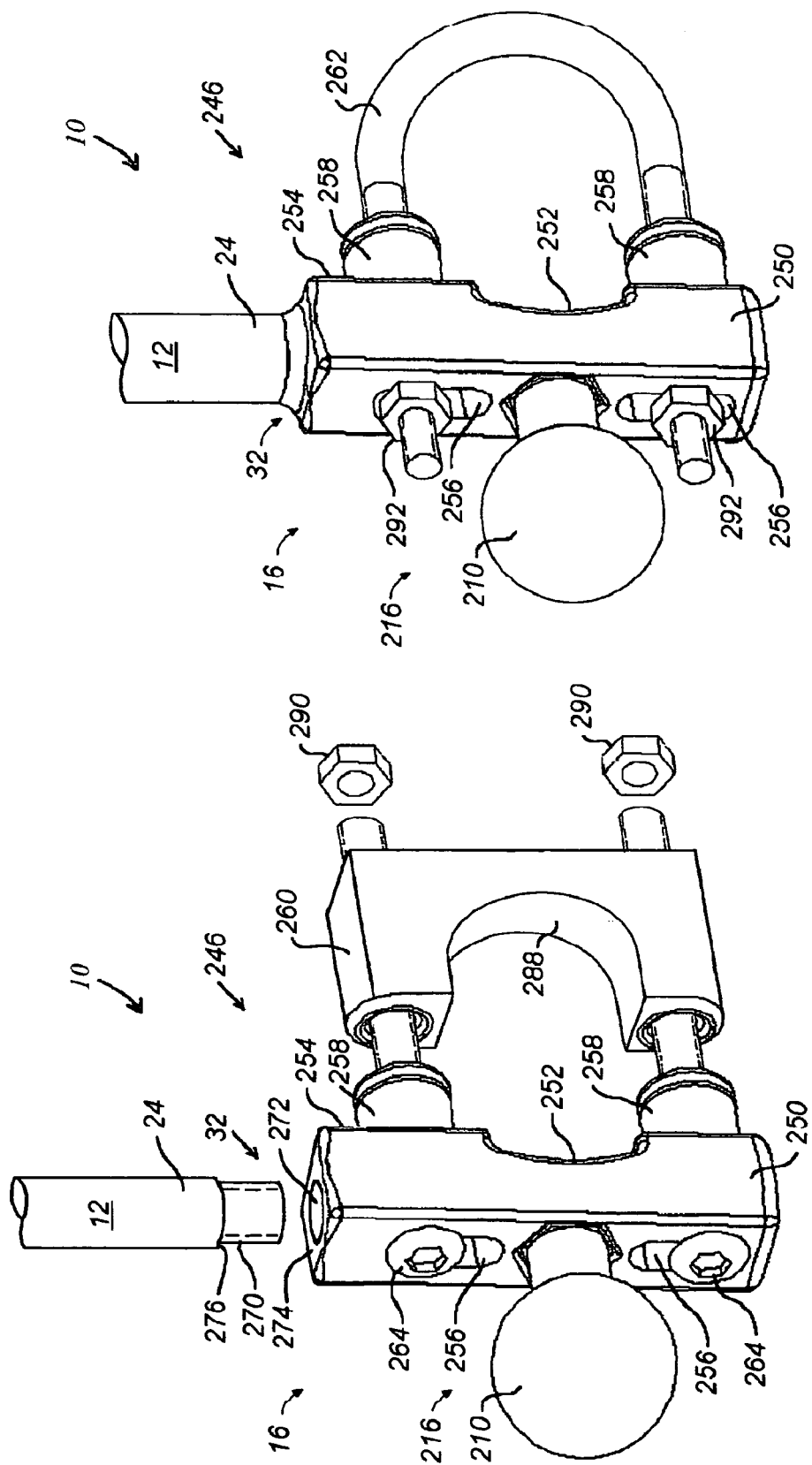

CONFIGURABLE MOUNTING APPARATUS

This application is related to and claims priority benefit co-pending U.S. patent application Ser. No. 10/836,494 entitled, "CONFIGURABLE MOUNTING BRACKET," filed in the name of Jeffrey D. Carnevali on Apr. 30, 2004, which is a Continuation-in-part and claims priority benefit of co-pending parent U.S. patent application Ser. No. 10/802,408 entitled, "CONFIGURABLE MOUNTING BRACKET," filed in the name of Jeffrey D. Carnevali on Mar. 17, 2004, and is further related to and claims priority benefit of co-pending U.S. patent application Ser. No. 10/698,158 entitled, "FLEXIBLE SUPPORT ARM," filed in the name of Jeffrey D. Carnevali on Oct. 31, 2003, and is further related to and claims priority benefit of co-pending U.S. patent application Ser. No. 10/862,688 entitled, "CONFIGURABLE MOUNTING BRACKET," filed in the name of Jeffrey D. Carnevali on Jun. 7, 2004, the complete disclosures of which are all incorporated herein by reference.

FIELD OF THE INVENTION

The present invention relates to a configurable mounting apparatus, and in particular to a vehicle-mountable multiply configurable mounting apparatus having a single permanently bendable support leg for mounting a portable desktop, a computer or the like.

BACKGROUND OF THE INVENTION

In today's business world many people need to carry a laptop computer, cellular telephone, personal digital assistant (PDA), global positioning system (GPS) navigation device, or another electronic or even mechanical device to conduct business on the road, vacation, or even conduct everyday business. In general, our automobiles, airplanes, boats and other vehicles were designed for carrying passengers, rather than laptop computers or portable desks or personal electronic devices. As a result, the laptop or desk or other device is dropped into the passenger seat where it is prey to sudden starts and stops and where it can be accessed only with difficulty by the driver leaning over the passenger seat. Such access is impossible while driving without courting an accident. Mounting brackets suitable for supporting a portable desk or laptop computer or other devices are generally well-known for permanent installation in an automobile or other vehicle. Some of these known vehicle-mountable brackets are configurable to fit different makes and models of vehicle. All but a few require cutting of the vehicle to fit the mounting bracket, trimming or cutting the bracket to fit, or at least drilling the vehicle to accept fasteners for securing the bracket. Furthermore, these known vehicle-mountable brackets are typically limited to presenting their mounting surfaces, and by extension the laptop computers or other device, in a predetermined single position relative to the vehicle driver or other user.

SUMMARY OF THE INVENTION

The present invention is a vehicle-mountable multiply configurable mounting apparatus that overcomes limitations of the prior art for securely mounting a portable desktop, a computer, cellular telephone, personal digital assistant (PDA), global positioning system (GPS) navigation device, or another electronic, or the like, or even mechanical device such as a desktop or the like. Accordingly, the mounting apparatus of the invention includes a single permanently bendable support formed of either a cylindrical solid support leg or tubular metal support leg, the support leg having a first lengthwise end portion fitted into a multiply positionable mounting platform, and a second lengthwise end portion opposite from the first lengthwise end portion fitted with a shoe that is structured with means for securing the second end portion relative to an external surface using a structure configured for being permanently fixed to the external surface with a mechanical fastener.

When the metal support leg is a tubular metal support leg, it is filled with a solidified filler material that causes it to retain a user-selected shape or configuration indefinitely.

According to another aspect of the invention, a method is provided for forming and filling the elongated tubular member and joining it together with the multiply positionable mounting platform and a support base into a vehicle mounting bracket of the type disclosed herein.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a perspective view of the single permanently bendable support leg and securing means of the mounting platform apparatus with the outer covering removed for clarity;

FIG. 3 is a perspective view that illustrates one alternative embodiment of the multiply positionable mounting platform of the invention structured as a pressure deformable ball mount, and further illustrates the securing means embodied as a foot mechanism that is structured as means for securing the mounting apparatus relative to an external surface, such as a floor of an automobile or other vehicle;

FIG. 15 illustrates another alternative embodiment of the mounting platform apparatus of the invention having the shoe-type securing means installed on both opposite ends of the support leg both for permanently attaching an external instrument or device on one end and on the opposite end for securing the mounting platform relative to an external surface, such as a floor of an automobile or other vehicle;

FIG. 16 illustrates another alternative embodiment of the mounting platform apparatus of the invention having a collet for gripping the base end of the support leg, and having a flanged mounting platform of the type illustrated in FIG. 3 installed on the opposite device mounting end of the support leg for permanently attaching an external instrument or device thereon;

FIG. 22 illustrates another alternative embodiment of the mounting apparatus of the invention having the support base embodied as another alternative embodiment of the handlebar mounting bracket assembly illustrated in FIG. 19; and FIG. 23 illustrates yet another alternative embodiment of the mounting apparatus of the invention having the support base embodied as another alternative embodiment of the mounting bracket assembly.

DETAILED DESCRIPTION OF PREFERRED EMBODIMENT

Figure 1:
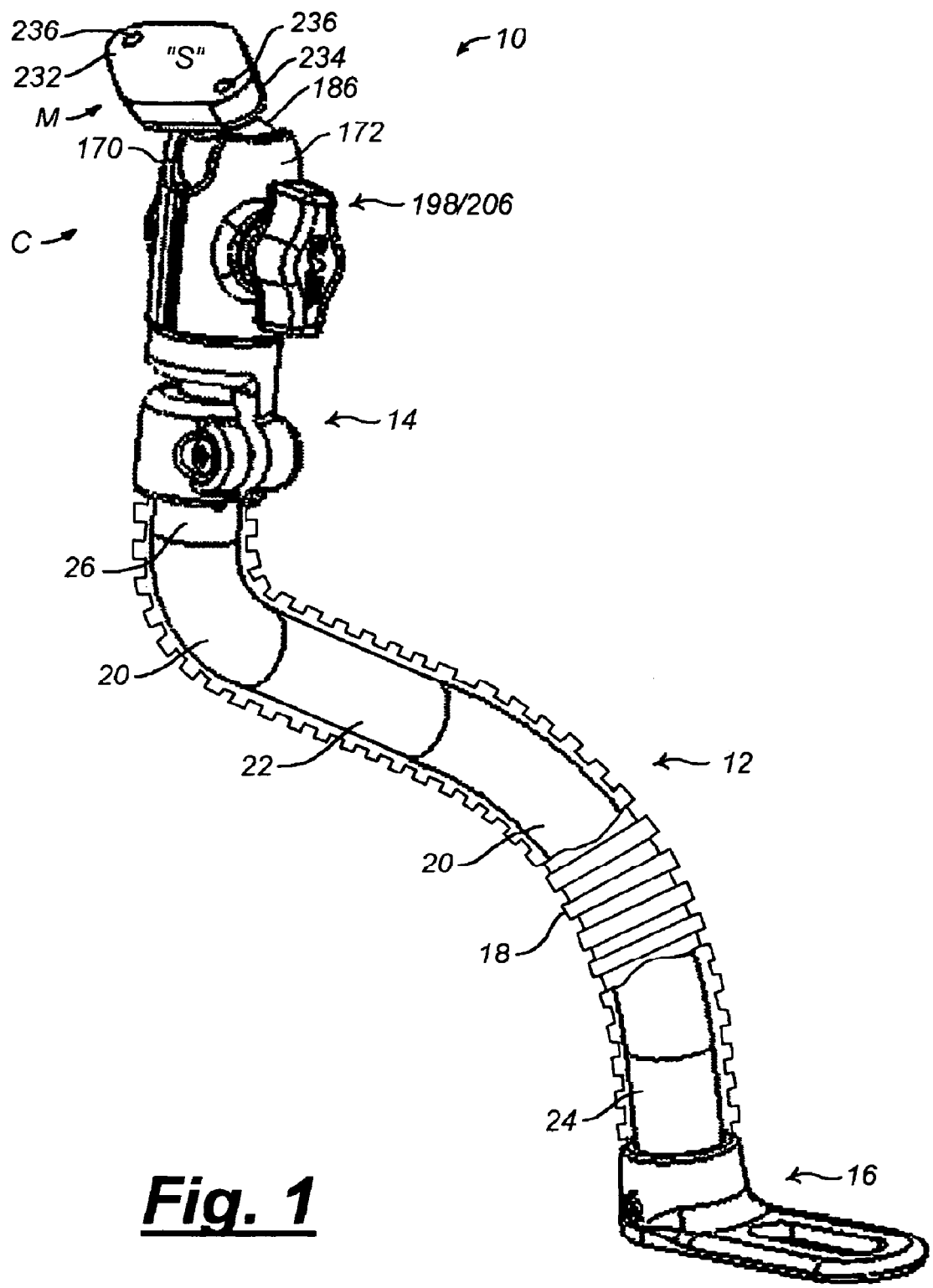
FIG. 1 is a perspective view that illustrates the invention embodied as a multiply configurable mounting apparatus formed of a permanently bendable elongated support leg with a multiply positionable mounting platform on one end having means for permanently attaching an external instrument or device and on the opposite end a shoe that is structured with means for securing the mounting platform relative to an external surface, such as a floor of an automobile or other vehicle.

In the Figures, like numerals indicate like elements.

The present invention is a multiply configurable support and device mounting platform apparatus for securely and fixedly mounting light or heavy objects in a multiply configurable relation to a fixed surface, and methods for manufacturing the same. The device mounting platform apparatus is formed of a permanently bendable support leg formed of either a solid metal rod or a filled metal tube that is mounted in a support base at one end and includes a mounting platform at its opposite end. An elastically flexible sheath or other coating optionally covers the permanently bendable metal rod or tube and is optionally secured at opposite ends to the support base and the device mounting platform.

The support base includes gripping means for coupling the support base to the end of the permanently bendable support leg, the gripping means alternatively either clamps the support base to the permanently bendable support leg, or fuses it to the support leg by conventional welding or another conventional metal-fusing process. When present, the elastically flexible plastic tubular sheath covering the support leg is optionally secured at one end to the support base and the mounting platform at the opposite end. The elastically flexible plastic tubular sheath is sized as a close fitting slip fit over the permanently bendable metal rod or tube support leg.

Accordingly, present invention is embodied in a permanently bendable elongated cylindrical support leg formed of either a solid metal rod or a filled tube, the support leg and having both a first lengthwise end portion that is permanently fitted into a device mounting platform, and a second lengthwise end portion opposite from the first lengthwise end portion that is permanently fitted with the support base that is structured with means for securing the second end portion relative to an external surface using a structure configured for being permanently fixed to the external surface, e.g., with a suction cup, adhesive or mechanical fastener.

The device mounting platform is, by example and without limitation, a combination coupler and mounting platform having a short substantially cylindrical body with the coupler portion formed in one end and the multiply positionable mounting platform formed in the opposite end.

The mounting platform portion of the device mounting platform is formed on a base provided by the substantially planar end surface of the cylindrical body formed opposite from the closed bottom of the truncated cylindrical cavity clamp portion. The mounting platform portion is structured with means for permanently attaching an external device thereto, either directly or through an intermediary mounting device. According to one embodiment of the invention, the means for permanently attaching an external device is structured as a multiply positionable mounting platform. The multiply positionable mounting platform portion is, by example and without limitation, a positively-positionable mounting platform shaped like a mushroom, including a multisided stem or axle portion projected from the end of the cylindrical body with a disc-shaped button or wheel portion mounted at the end distal from the cylindrical body.

Alternatively, the multiply positionable mounting platform portion is, by example and without limitation, a substantially smooth, part-spherical ball mount of the type described by Carnevali in U.S. Pat. No. 5,845,885, entitled "UNIVERSALLY POSITIONABLE MOUNTING DEVICE," the complete disclosure of which is incorporated herein by reference, and is formed of a pressure deformable, resilient elastomeric material which renders part-spherical the ball mount relatively radially compressible.

According to another alternative embodiment of the invention, the mounting platform portion of the device mounting platform is a substantially planar mounting surface with means for mounting an external device thereon, the mounting means being, for example, holes for one or more threaded fasteners, a strip or bi-adhesive tape, or another adhesive.

According to yet another alternative embodiment of the invention, the mounting platform portion of the device mounting platform is a suction cup.

The coupler is structured for coupling the device mounting platform to the end of the permanently bendable support leg. The coupler portion is, by example and without limitation, a clamp formed of a split female collar forming therein a truncated cylindrical cavity with a closed bottom and a threaded side closure operating as a coupling means. Alternatively, the coupler portion is a closed tubular collar forming therein the truncated cylindrical cavity with the closed bottom and a set screw clamp operating through a sidewall of the cylindrical cavity at one or more positions spaced around the periphery for proving the coupling means. According to another embodiment of the invention, the tubular coupler collar is welded to the support leg, whereby the weld joint operates as the coupling means.

According to one embodiment of the invention, the permanently bendable support leg of the present invention includes a flexible sheath or coating, such as a discrete elastically flexible plastic tubular sheath, paint, chemical, electrolytic or other coating, covering substantially the entirety of the permanently bendable support leg. When the support leg is covered by a discrete flexible sheath, the ends of the sheath are optionally secured at one end of the support leg to the coupler of the device mounting platform and at the opposite end to the gripping means of the support base.

FIG. 1 is a perspective view that illustrates the invention embodied as a multiply configurable mounting apparatus 10 formed of a permanently bendable elongated cylindrical support leg 12 and a mounting platform 14 embodied as a multiply positionable mounting platform having means M for permanently attaching an external instrument or device. As discussed in detail herein, the support leg 12 is formed by either a permanently bendable metal rod or a permanently bendable tube filled with a hardenable substance. The support leg 12 is fitted at one end with the multiply positionable mounting platform 14 and is fitted at an end opposite the mounting platform 14 with a support base 16 structured as a means for securing the second end of the support leg 12 relative to an external surface using a support base configured for being permanently fixed to the external surface with a mechanical fastener. As illustrated in FIG. 1, the support base securing means 16 is embodied as a slotted shoe mechanism that is structured as means for securing the mounting apparatus 10 relative to an external surface, such as a floor of an automobile or other vehicle. The support leg 12 optionally includes a flexible outer covering 18 that is alternatively configured as a elastically flexible plastic tubular sheath covering substantially the entirety of the permanently bendable support leg 12 exposed between the mounting platform 14 with support base securing means 16. When embodied as a elastically flexible sheath, the covering 18 is a corrugated plastic tube sized as a close slip fit over the outer diameter of the support leg 12, as shown in FIG. 1. Alternatively, the covering 18 is a flexible plastic sheath embodied as one of an accordion configuration plastic sheath, a smooth-finished plastic tube, a thick foam tube, or another flexible plastic sheath that substantially covers the support leg 12, while permitting it to be permanently bent to desired configurations without appreciable interference or restriction. Such alternative sheath materials for the covering 18 are well-known to those of skill in the art so as not to require detailed descriptions. When embodied as such an elastically flexible sheath, the covering 18 is optionally secured at opposite ends to the mounting platform 14 and support base 16 at opposite ends of the support leg 12.

FIG. 2 is a perspective view of the single permanently bendable support leg 12 and support base 16 of the mounting platform apparatus 10 with the covering 18 removed for clarity. As illustrated in FIG. 2, the support leg 12 is an elongated permanently bendable metal rod or filled tube. It is intended that the length of the support leg 12 be set during manufacturing by shortening from a standard length. However, the length may be a standard length at the time of shipment from the factory and later modified as appropriate by an installer or end user. Accordingly, the support leg 12 may be sized to substantially rigidly support the weight of a portable desk or laptop computer on a platform, for example, of the type described by Carnevali, the inventor of the present invention, in U.S. Pat. No. 6,585,212, issued Jul. 1, 2003, entitled "QUICK RELEASE ELECTRONICS PLATFORM," which is incorporated herein by reference. By example and without limitation, the support leg 12 is embodied as an elongated cylindrical solid rod support leg 12 of a permanently bendable aluminum or aluminum alloy with a substantially constant diameter of about ½ inch, but at least in the range of about ⅛ inch, ¼ inch or ⅜ inch to about 1 inch. When embodied as a permanently bendable cylindrical solid rod, the support leg 12 is alternatively realized in steel, copper, permanently bendable copper alloys or another permanently bendable metal or rigid plastic material without limiting the practice of the invention.

According to one embodiment of the invention, the metal rod support leg 12 is formed of solid aluminum. Alternatively, the metal rod support leg 12 is formed of solid copper rod that is optionally coated with zinc. The inventor discovered that embodiment of the support leg 12 as a solid copper rod provides unexpected substantial structural advantages over the solid aluminum rod: the solid copper rod is permanently bendable similarly to the solid aluminum rod, but the copper rod is much stronger for a similar rod diameter so that a relatively slender copper rod can support loads weighing as much as the loads supportable by a larger diameter aluminum rod. Therefore, when embodied as a solid copper rod, the metal rod support leg 12 is formed with a diameter that is much smaller than an aluminum rod for supporting a load of the same weight.

By example and without limitation, the permanently bendable support leg 12 is illustrated as having different bent and substantially straight portions 20, 22, respectively, permanently formed along its elongated length.

The permanently bendable support leg 12 also includes a first and second respective short and substantially straight lengthwise end portions 24 and 26 for coupling the respective support base 16 and multiply positionable mounting platform 14 to the support leg 12.

The short and substantially straight lengthwise end portion 24 of the support leg 12 is fitted with the securing a means 16. When embodied as illustrated in the example of FIG. 2, the support base 16 is embodied as a slotted shoe that is structured with means for securing the support leg end portion 24 relative to an external surface. When embodied as such a shoe, the support base 16 includes means for gripping the leg end portion 24. By example and without limitation, the shoe-type support base 16 is provided with an ankle portion 28 having an aperture 30 sized to admit the leg end portion 24 and gripping means 32 for gripping it, such as one or more threaded fasteners F or set screws applied to an internally threaded aperture (as indicated at 32). Alternatively, the shoe 16 is fused to the leg end portion 24 by conventional means such as welding, soldering or brazing. By example and without limitation, the shoe-type support base 16 is formed of a substantially rigid material, e.g., metal or hard plastic, and includes a foot portion 34 that is structured with fixing means 36 for being permanently fixed to the external surface using a mechanical fastener. For example, the fixing means 36 of the shoe foot portion 34 is structured as an aperture or slot formed therethrough that is sized to pass a mechanical fastener, such as a screw or bolt, for securing the shoe fixing means 36 to the external surface, such as a floor of an automobile or other vehicle. The support leg 12 is bendable by hand to orient a sole portion 38 of the foot 34 into substantially parallel alignment with the external mounting surface for more securely fixing the shoe-type support base 16 thereto.

FIG. 2 also illustrates the mounting apparatus 10 of the invention having the bendable metal support leg 12 permanently formed in bent configuration with the leg end portion 24 configured to cause the sole 38 of the shoe-type support base 16 to be oriented substantially horizontally. The bendable metal support leg 12 is thus permanently bent to orient the sole 38 of the shoe-type support base 16 for attachment to a substantially horizontal mounting surface, such as the floorboard of an automobile at an attachment point along one side of one of the front seats. The mounting apparatus 10 of the invention is thus installed in the automobile at the attachment point of, for example, the driver or passenger front seat, without need of any drilling or cutting of the automobile's structure, by simply one of the bolts holding the seat to the floorboard, bending the support rods 12 and optionally rotating the shoe-type support base 16 to align the shoe sole 38 with the floorboard and present the slot 36 over the hole in the floorboard for the bolt holding the seat, and re-installing the bolt, thereby securing the shoe-type support base 16 and the mounting apparatus 10 to the floorboard along with the seat. This operation presents the multiply positionable mounting platform 14 and its means M for permanently attaching an external instrument or device in a position, for example, ahead of the front passenger seat adjacent to the hump and above the seat bottom cushion and any center console that may be present in the automobile. The mounting platform 14 is thus positioned for presenting a portable desk or laptop computer on a platform in a position convenient to the automobile's driver. In the example of FIG. 1, the mounting platform 14 is configured for attachment of the attaching means M which is embodied, by example and without limitation, as a universal positioning device of the type described by Carnevali in U.S. Pat. No. 6,561,476, "POSITIVELY-POSITIONABLE MOUNTING APPARATUS," which is incorporated herein by reference.

Optionally, the aperture 30 for admitting the leg end portion 24 is further configured with a larger annular cavity formed by an annular collar 40, i.e., a counter-bore, that is an upper portion of the ankle 28 substantially concentric with the aperture 30 and sized to admit and optionally secure the covering 18 when present and embodied as a plastic tubular sheath, a corrugated plastic tube, an accordion configuration plastic sheath, a smooth-finished plastic tube, a thick foam tube, or another flexible plastic sheath, as discussed herein. In other words, the collar 40 is large enough to tuck in the end of the plastic sheath covering 18. Optionally, the annular cavity in the collar 40 is sized such that the plastic sheath covering 18 is pinched between the support leg 12 and an inner wall surface 42 of the collar cavity when the support leg end portion 24 is secured within the aperture 30 during assembly.

According to one embodiment of the invention, the flexible plastic sheath 18 is a conventional coating that covers the support leg 12 while permitting it to be bent to desired shapes without interference. By example and without limitation, the coating 18 is a paint, such as a rubberized paint, a polyurethane or other flexible synthetic dip or coat, or another electrochemical coating that is fused to the exterior surface of the support leg 12. When the support leg 12 is embodied as an aluminum rod or tube, the coating is optionally anodizing. When the support leg 12 is embodied as a copper rod or tube, the coating is optionally zinc plating. Such alternative coatings 18 are well-known to those of skill in the art so as not to require detailed descriptions.

FIG. 3 illustrates the support base 16 embodied as a foot mechanism that is structured as means for securing the mounting apparatus 10 relative to an external surface, such as a floor of an automobile or other vehicle. The foot-type support base 16 is formed with a substantially planar mounting surface 44 on its underside opposite from the main body of the support leg 12. According to one or more embodiments of the invention, the foot-type support base 16 is provided with a peripheral flange 46 having a centrally located tubular boss 48 which includes the aperture 30 for admitting the leg end portion 24 by which the permanently bendable support leg 12 is attached, as discussed below. The flange 46 of the foot-type support base 16 is optionally structured with multiple apertures 50 that operate as mounting holes by which the foot-type support base 16 is permanently mounted to a fixed surface, such as a mounting surface in an automobile or other vehicle. The multiple apertures 50 are thus embodied as clearance holes for mounting screws (not shown) used to secure the foot-type support base 16 to the fixed mounting surface. The apertures 50 are optionally formed with countersinks or counter-bores to accommodate the heads of the mounting screws. According to other embodiments of the invention, the substantially planar mounting surface 44 of the foot-type support base 16 is supplied with an adhesively bondable surface, or a resilient adhesive pad, commonly known as a Pressure Sensitive Adhesive (PSA) 51, applied between the mounting surface 44 and an appropriate fixed surface, such as a mounting surface in an automobile or other vehicle.

FIG. 3 also illustrates the leg end gripping means 32 embodied as a means for fusing the shoe-type support base 16 or foot-type support base 16 (shown) to the leg end portion 24. Such fusing-type leg end gripping means 32 includes, by example and without limitation, partial or complete conventional weld solder or braze joints when the shoe-type or foot-type support base 16 and the leg end portion 24 are formed of suitable metal or plastic materials. Alternatively, the fusing-type leg end gripping means 32 includes conventional chemical and ultrasonic weld joints when the support base 16 and the leg end portion 24 are formed of other suitable metal or plastic materials. See, for example, the ultrasonic weld joint and process for making the same disclosed by the inventor of the present invention in U.S. patent application Ser. No. 10/698,158, the complete disclosure of which is incorporated herein by reference.

Figure 4:
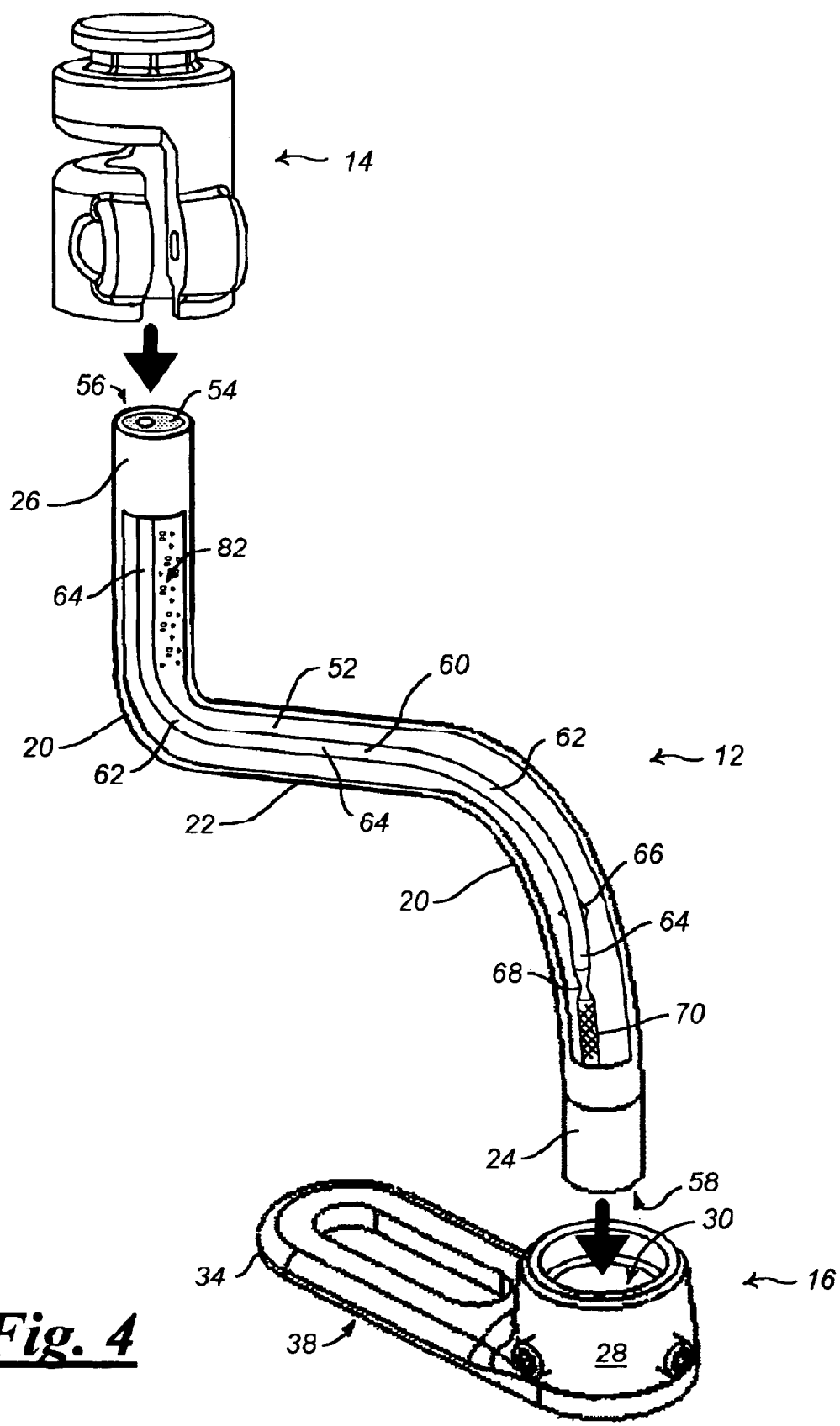
FIG. 4 illustrates the mounting apparatus of the invention having the support leg embodied as a permanently bendable elongated tubular metal or plastic support leg having an interior lengthwise tubular cavity that is filled with a solidified filler material.

FIG. 4 illustrates the mounting apparatus 10 of the invention having the support leg 12 embodied as a permanently bendable elongated tubular metal or plastic support leg 12 having an interior lengthwise tubular cavity 52 that extends substantially the entire length of the tubular support leg 12 and is filled with a solidified filler material 54 and substituted for the permanently bendable elongated metal support rod leg 12 shown in earlier embodiments. Accordingly, the permanently bendable metal support rod leg 12 is replaced with a permanently bendable elongated tubular metal or plastic support leg 12 formed of an elongated cylindrical tube with a substantially constant diameter of about ½ inch, but at least in the range of about ¼ inch or ⅜ inch to about 1 inch. The permanently bendable tubular support leg 12 is optionally formed of a permanently bendable metal, such as aluminum or a bendable aluminum alloy, or another permanently bendable metal. The permanently bendable tubular support leg 12 is alternatively realized in steel, copper, permanently bendable copper alloys or another permanently bendable metal or permanently bendable plastic material without limiting the practice of the invention.

According to one embodiment of the present invention, the permanently bendable tubular support leg 12 includes the short and substantially straight lengthwise leg end portion 24 opposite from the multiply positionable mounting platform 14 and is fitted with one of the shoe-type support base 16 or another support base 16 that is structured with means for securing the leg end portion 24 relative to an external surface. Alternatively, the support base 16 is welded, soldered, brazed or otherwise fused to the leg end portion 24. The tubular support leg 12 is bendable by hand to orient the sole 38 of the shoe-type support base 16 into substantially parallel alignment with the external surface for more securely fixing the shoe-type support base 16 thereto. By example and without limitation, the bendable tubular support leg 12 is illustrated as having the different bent and substantially straight portions 20, 22, distributed along its elongated length. After permanent bending of the tubular support leg 12 to a desired configuration, a solidifiable filler material 54 is flowed, pumped, injected or otherwise installed within the interior of the bent tubular support leg 12 using known methods to fill substantially the entire length of the interior lengthwise tubular cavity 52, including the different bent and substantially straight portions 20, 22 and the short lengthwise end portions 24 and 26.

The solidifiable filler material 54 is of a type that is flowable in a first state and rigidly solidified or "hardened" in a second state that occurs at a later time. The solidifiable filler material 54 is, by example and without limitation, any air-curable epoxy resin that is flowable liquid in a first state and solidifies into a rigid solid structure in a second state. Alternatively, the solidifiable filler material 54 is, by example and without limitation, another material that is flowable in a first state and rigidly solid in a second state that occurs at a later time, such as a latex or a gypsum-based material, such as plaster of Paris, gypsum plaster, or Portland cement. According to another alternative embodiment of the present invention, the solidifiable filler material 54 is a plastic material which is a high-polymeric substance, including both natural and synthetic products, that is capable of flowing, possibly under applied heat and pressure, into the previously bent interior lengthwise tubular cavity 52 of the permanently bent tubular support leg 12 and substantially filling the entire interior lengthwise tubular cavity 52 and forming itself to the bent configuration of the previously permanently bent tubular support leg 12 before solidifying into a relatively rigid solid having the shape of the interior lengthwise tubular cavity 52. For example, the solidifiable filler material 54 is a plastic of the thermoplastic family that includes styrene polymers and copolymers; acrylics such as acrylic resin or acrylonitrile-based materials; cellulosics; polyethylenes; polypropylene; nylons and vinyls such as Polyvinyl Chloride (PVC) or CPVC. See, e.g., Plastics Engineering Handbook of The Society of the Plastics Industry, Inc., edited by Michael L. Berins, 1991.

According to another example, the solidifiable filler material 54 is a plastic of the thermosetting family that includes aminos, i.e., melamine and urea, polyesters, alkyds, epoxies, and phenolics. See, e.g., Plastics Engineering Handbook of The Society of the Plastics Industry, Inc., edited by Michael L. Berins, 1991.

The solidifiable filler material 54 is optionally an injection-molded pigmented or unpigmented High Density Polyethylene (HDPE) plastic.

Accordingly, the solidifiable filler material 54 is pourable, injectable or otherwise installable into the interior lengthwise tubular cavity 52 of the previously permanently bent tubular support leg 12 through an opening 56, 58 in the respective short lengthwise end portions 24 and 26, as indicated by the arrows. When the solidifiable filler material 54 is cured or otherwise solidified, it provides an extremely rigid support structure within the previously permanently bent tubular leg 12. Even solidifiable filler materials that remain relatively flexible in their solidified state are useful for practicing the present invention because the material substantially fills the interior cavity which prevents the outer tubular sleeve, i.e., the support leg 12, from collapsing. Several different rigidly solidifiable filler materials 54 and relatively flexibly solidifiable filler materials 54 are known and commercially available. Some examples are given but it will be understood that the listed materials are only examples and other solidifiable filler materials 54, both known and unknown, may be substituted. Accordingly, without limitation one example of a suitable rigidly solidifiable filler material 54 is disclosed by Cole, et al. in U.S. Pat. No. 4,072,194, "PUMPABLE EPOXY RESIN COMPOSITION," the complete disclosure of which is incorporated herein by reference and which teaches an epoxy resin composition curable to a hard impermeable solid, and which may be available from Halliburton Company of Duncan, Okla. Another example of a suitable rigidly solidifiable filler material 54 is disclosed by Riew, et al. in U.S. Pat. No. 4,107,116, "EPOXY RESIN PLASTICS," the complete disclosure of which is incorporated herein by reference and which teaches a hard and strong epoxy resin products of high impact resistance, and which may be available from The B. F. Goodrich Company of Akron, OH. Yet another example of a suitable rigidly solidifiable filler material 54 is disclosed by Schimmel, et al. in U.S. Pat. No. 4,126,596, "TWO PACKAGE POLYMERIC EPOXY COMPOSITIONS HAVING IMPROVED POT-LIFE," the complete disclosure of which is incorporated herein by reference and which teaches a two-package polymeric compositions which form a cured, hard, stain and solvent resistant material, and which may be available from PPG Industries, Inc. of Pittsburgh, Pa. It will be understood that the above rigidly and relatively flexibly solidifiable filler materials are given by example and without limitation as commercial products that are believed to have characteristics that make them suitable for use as the solidifiable filler material 54. However, other materials, both known and unknown, may be suitable substitutes therefore, the suitable solidifiable filler material 54 having the characteristics of being in a first state flowable, pumpable, injectable or otherwise installable within the elongated tubular interior cavity of the bent tubular support leg 12 using known methods for filling substantially the entire length of the interior, including the different bent and substantially straight portions 20, 22 and the short lengthwise end portions 24 and 26, and being in a second state that occurs at a relatively later time after the first state a rigidly or relatively flexibly solidified material filling substantially the entire length of the interior, including the different bent and substantially straight portions 20, 22 and the short lengthwise end portions 24 and 26 of the bent tubular support leg 12. Adhesion is an optional useful characteristic of the solidifiable filler material 54, whereby the solidified filler material 54 adheres to the interior wall surfaces of the bent tubular support leg 12.

When the solidifiable filler material 54 is a material such as epoxy resin, a gypsum-based material, a thermoplastic or thermosetting plastic, or a pigmented or unpigmented High Density Polyethylene (HDPE) plastic that, in its second solid state, is hardenable to a rigidly solid structure, the hardenable filler material 54 reinforces the tubular support legs 12 resists collapse thereof by means of its rigidity. On the other hand, solidifiable filler materials 54 such as latex, rubber, and room temperature vulcanizing silicone rubber (RTV) solidify into flexible materials that may flow with bending of the tubular support legs 12. Such flexible filler materials 54 reinforce the tubular support legs 12 by resisting collapse thereof. Additionally, such flexible filler materials 54 typically include the adhesive characteristic, whereby the material 54 adheres to the wall of the interior cavity 52, which severely limits its ability to flow under load.

After installation and curing or otherwise solidifying of the solidifiable filler material 54 within the previously permanently configured tubular support leg 12, the support base 16 is installed on the first short lengthwise end portion 24, and the multiply positionable mounting platform 14 is installed on the opposite second short lengthwise end portion 26. Thereafter, the previously configured or bent tubular support legs 12 cannot be straightened, bent or otherwise reformed from their respective permanent configurations because of the relative inflexibility and substantial incompressibility of the cured or otherwise solidified filler material 54 being contained within interior cavity 52 of the tubular leg 12 and being restrained from flowing relative thereto. The mounting apparatus 10 is thus permanently configured without any reasonable possibility of being straightened, bent or deformed under expected loads since such bending or deformation requires compression, flow, and shattering or flexing of the solidified filler material 54 and subsequent collapse of the tubular leg 12. As discussed herein, even when the filler material 54 is a relatively flexible solid it resists collapse of the tubular cavity 52 and thus supports the leg 12 in its previously bent configuration. The resulting mounting apparatus 10 can only be reconfigured by replacement of the tubular support leg 12, either with another tubular support leg 12 or with the permanently bendable elongated cylindrical solid metal support leg 12. Accordingly, the mounting apparatus 10 of the present invention optionally includes either the permanently bendable elongated cylindrical solid metal support rod 12 or the filled bendable tubular support leg 12.

FIG. 4 also illustrates the permanently bendable tubular support leg 12 being partially filled with the solidified filler material 54 being further internally reinforced with one or more permanently bendable internal reinforcing stiffeners 60 embodied, by example and without limitation, as permanently bendable elongated stiffener rods. When present, each of the one or more permanently bendable stiffener rods 60 operate as reinforcement bars, similar to "re-bar" in concrete, to further stiffen the structure and ensure integrity should the solidified filler material 54 flow or crack under load. By example and without limitation, the permanently bendable stiffener rods 60 are embodied as permanently bendable metal support rods formed for example, of a permanently bendable aluminum or aluminum alloy with a substantially constant diameter or other cross-sectional dimension of about ¼ inch, but at least in the range of about ⅛ inch to about ⅜ inch or even ½ inch. The permanently bendable stiffen are alternatively realized in steel, copper, permanently bendable copper alloys or another permanently bendable metal or rigid plastic material and may be flat, round, square, hexagonal or another cross-sectional shape without limiting the practice of the invention.

In FIG. 4 the solidly filled, permanently bendable tubular support leg 12 is illustrated in partial lengthwise cross-section along a longitudinal axis of the tubular support leg 12, whereby the solidified filler material 54 and stiffener rod 60 are partially exposed. As illustrated, the stiffener rod 60 is permanently bent into a configurations that generally reflects the bent configurations of the corresponding tubular support leg 12. The stiffener rod 60 is expected to be inserted into the interior lengthwise tubular cavity 52 of the tubular support leg 12 prior to bending, and the stiffener rod 60 is bent concurrently with the tubular support leg 12. Resulting bent portions 62 in the stiffener rod 60 generally mimic the corresponding bent portions 20 of the tubular support leg 12, and remaining straight portions 64 generally correspond to the different straight portions 22. When bends in the tubular support leg 12 are minimal such that the bent portions 20 and straight portions 22 are substantially aligned, the bent portions 62 of the stiffener rod 60 are minimized or completely eliminated so that the stiffener rod 60 is substantially straight for its entire length, i.e., a single substantially straight portion 64, and the stiffener rod 60 can be inserted after the tubular support leg 12 is configured, i.e., permanently bent.

After the stiffener rod 60 is inserted into the tubular support legs 12 and the support leg 12 and stiffener rod 60 are bent, or after the straight or slightly bent stiffener rod 60 is inserted into the previously bent tubular support leg 12, as described above for a tubular support leg 12 having minimal bends, a sufficient quantity of the solidifiable filler material 54 is flowed, pumped, injected or otherwise provided within the lengthwise interior cavity 52 using known methods to fill substantially the entire length of the interior cavity 52, including the different bent and substantially straight portions 20, 22 and the short lengthwise end portions 24 and 26. As discussed herein, adhesion is an optional useful characteristic of the solidifiable filler material 54, whereby the solidifiable filler material 54 adheres the bent stiffener rod 60 to wall surfaces of the interior cavity 52.

As discussed herein, after installation and solidifying of the solidifiable filler material 54 within the interior cavity 52 of the previously permanently bent tubular support leg 12, the multiply positionable mounting platform 14 is installed on the short lengthwise end portions 26, and the support base 16 is installed on the opposite short lengthwise end portion 24. Thereafter, the previously permanently bent tubular support leg 12 cannot be bent, collapsed or otherwise reformed from their respective previously permanently bent configurations because of the incompressibility and rigidity of the solidified filler material 54 operating in combination with the stiffness of the interior stiffener rod 60 and the wall stiffness of the bent tubular support leg 12. Accordingly, the mounting apparatus 10 is permanently configured without any reasonable possibility of being bent or deformed or otherwise failing under expected loads since such bending or deformation requires flowing or shattering and collapse of solidified filler material 54 and concurrent bending of both the tubular support leg 12 and the rigid interior stiffener rod 60.

According to one embodiment of the invention, one or more barbs 66 or necked-down portions 68 are optionally formed one or more of the interior stiffener rods 60. Alternatively, the interior stiffener rods 60 are provided with a rough surface finish that promotes adhesion of the solidifiable filler material 54. The barbs 66, necked-down portions 68 and/or surface finish 70, such as knurling or other surface roughening, increase mechanical coupling, i.e., gripping, between the interior stiffener rod 60 and the solidifiable filler material 54. The resultant coupling or gripping interlocks the interior stiffener rod 60 with the bent tubular support leg 12 and further limits the flowability of the solidified filler material 54 which thereby increases the overall stiffness of the support leg 12. The mounting apparatus 10 can only be reconfigured by replacement of the tubular support leg 12 with another permanently bendable elongated support leg 12 embodied either as the permanently bendable elongated tubular support leg or as the permanently bendable elongated cylindrical solid rod support leg. Accordingly, the mounting apparatus 10 of the present invention includes one or the other of the permanently bendable elongated cylindrical solid metal support rod 12 or the permanently bendable elongated solidly-filled bendable tubular support leg 12.

Figure 5:
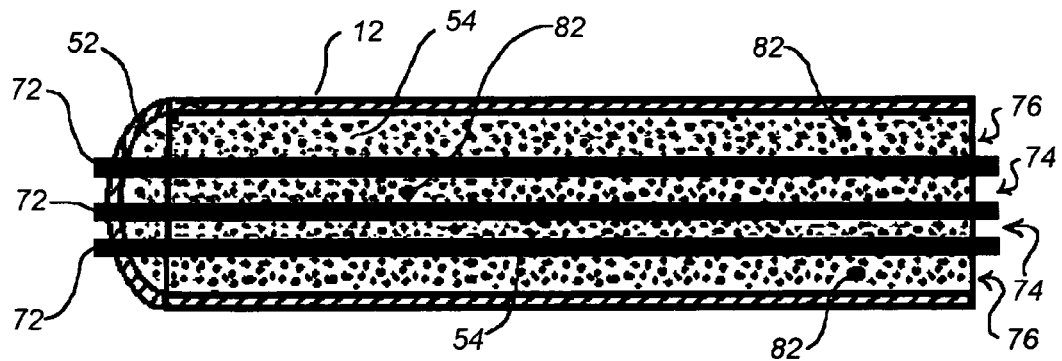
FIG. 5 illustrates one alternative embodiment of the invention illustrated in FIG. 4 having a permanently bendable interior reinforcing stiffener rod.

FIG. 5 illustrates one alternative embodiment of the present invention having an alternative permanently bendable interior reinforcing stiffener 72 formed of a plurality of relatively smaller or lighter gage, i.e., thinner, permanently bendable interior support wires that are substituted for the permanently bendable interior stiffener rod 60 illustrated in FIG. 4. By example and without limitation, the plurality of permanently bendable interior reinforcing support wires 72 are formed, for example, of a permanently bendable aluminum or aluminum alloy having a substantially constant diameter of about 1/16 inch, or in the range of about 1/32 inch to about 1/8 inch diameter or other cross-sectional dimension. The permanently bendable support wires 72 are alternatively realized in steel, copper, permanently bendable copper alloys or another permanently bendable metal or rigid plastic material and may be flat, round, square, hexagonal or another cross-sectional shape without limiting the practice of the invention. The plurality of permanently bendable interior reinforcing support wires 72 are expected to be sufficiently flexible as to permit insertion after the permanently bendable tubular support leg 12 is configured. However, reinforcing wires 72 formed of larger diameters of stiffer materials are optionally inserted before configuring of the respective tubular support legs 12 and are configured concurrently therewith.

After the interior reinforcing support wires 72 are inserted into the tubular support leg 12 and after the support leg 12 and interior support wires 72 are bent, a sufficient quantity of the solidifiable filler material 54 is flowed, pumped, injected or otherwise installed within the interior of each bent tubular support leg 12 using known methods to fill substantially the entire length of the interior cavity, including the different bent and substantially straight portions 20, 22 and the short lengthwise end portions 24 and 26. The solidifiable filler material 54 fills spaces 74 between the different interior support wires 72 as well as spaces 76 between the different interior support wires 72 and the wall surfaces of the interior cavity 52. The plurality of permanently bendable interior reinforcing support wires 72 operate to further reinforce and stiffen the structure and ensure integrity should the solidified filler material 54 flow or crack under load.

As discussed herein, adhesion is an optional useful characteristic of the solidifiable filler material 54, whereby the solidifiable filler material 54 adheres the bent interior reinforcing support wires 72 to one another and to the interior wall surfaces of the interior cavity 52 of the permanently bent tubular support leg 12.

Figure 6:
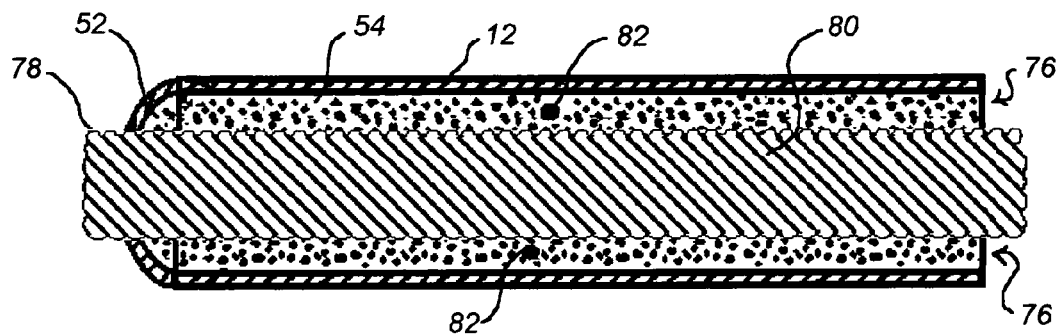
FIG. 6 illustrates another alternative embodiment of the invention illustrated in FIG. 4 having an alternative permanently bendable interior reinforcing stiffener formed of a twisted cable.

FIG. 6 illustrates another alternative embodiment of the present invention having another alternative permanently bendable interior reinforcing stiffener 78 formed of a twisted cable that is substituted for the permanently bendable interior reinforcing stiffener rod 60 illustrated in FIG. 4. The twisted cable 78 is, by example and without limitation, a commercially available twisted cable formed of plurality of relatively lighter gage, i.e., thinner, permanently bendable interior support wires 80 twisted about a central longitudinal axis into a single cable or "wire rope" of a type that is generally well known. By example and without limitation, the twisted cable 78 is formed of light gage, i.e., thin, steel wire strands 80 twisted together to form a stiff but bendable wire rope.

By example and without limitation, the plurality of thin permanently bendable interior support wires 80 are alternatively realized in a permanently bendable aluminum or aluminum alloy, copper, a permanently bendable copper alloy, or another permanently bendable metal or rigid plastic material without limiting the practice of the invention. The twisted cable 78 is expected to be sufficiently flexible as to permit insertion after the tubular support leg 12 is configured. However, twisted cables 78 formed of larger diameters of stiffer materials are optionally inserted before configuring the tubular support leg 12 and are configured concurrently therewith.

After the twisted cables 78 are inserted into the tubular support leg 12 and after the support leg 12 and twisted cables 78 are permanently bent into a desired configuration, a sufficient quantity of the solidifiable filler material 54 is flowed, pumped, injected or otherwise installed within the interior cavity 52 of the bent tubular support leg 12 using known methods to fill substantially the entire length of the interior cavity 52, including the different bent and substantially straight portions 20, 22 and the short lengthwise end portions 24 and 26. The solidifiable filler material 54 fills spaces 76 between the twisted cable 78 and the interior wall surfaces of the interior cavity 52, as well as seeping between the individual wires 80 that comprise the cable 78. The twisted cables 78 operates to further reinforce and stiffen the structure and ensure integrity should the solidified filler material 54 flow or crack under load.

As discussed herein, adhesion is an optional useful characteristic of the solidifiable filler material 54, whereby the solidified filler material 54 adheres the bent twisted cables 78 to the wall surfaces of the interior cavity 52, as well adhering the individual cable wires 80 as to one another.

FIG. 5 and FIG. 6 also illustrate another embodiment of the present invention wherein the solidifiable filler material 54 is filled and thereby reinforced with stiffener particles 82 mixed thereinto. Numerous stiffening filler particles 82 are well-known and commercially available for use in tailoring the properties of a liquid plastic or other solidifiable filler material prior to casting in the support leg 12. When used as filler, such stiffening particles 82 increase the viscosity of the liquid solidifiable filler material 54, i.e., operate as a thickening agent, and also affect the properties of the solidified filler material 54. Density and strength are two properties that are increased by stiffening filler particles 82. Sand and gravel are stiffening filler particles 82 commonly added to cement. For plastic filler materials 54, the stiffening filler particles 82 may be powder filler particles, such as aluminum powder. Cab-o-sil is a well-known resin thickening (thixotropic) stiffening filler particle additive 82 for polyester or epoxy solidifiable filler materials 54 and some urethane solidifiable filler materials 54, especially for use as a urethane adhesive. Chopped strands of fiberglass in ¼" or ½" lengths are common stiffening filler particles 82 usually used to strengthen liquid polyester resin filler materials 54, but is also be used in urethane filler materials 54 in combination with Fillite to increase cured strength. Fiberglass flock is a stiffening filler particle 82 used to thicken a solidifiable liquid polyester filler material 54 to a paste-like consistency, and because fiberglass flock particles 82 are actually ground glass, they greatly increase the strength of the solidifiable filler materials 54. Fillite is a gray powder stiffening filler particle 82 added to solidifiable liquid urethane filler materials 54 as an inexpensive stiffening filler particle 82 that takes up volume so that less is used of a more expensive solidifiable liquid filler material 54. Because of its density, Fillite will neither float nor sink in a solidifiable liquid resin filler material 54. Cured castings of the solidifiable filler materials 54 can be achieved that will float in water if enough is added. Sil-Cell Microballoons are hollow silica spheres that behave similarly to Fillite as a stiffening filler particle 82, except that the particles have a higher tendency to float in low-viscosity solidifiable filler materials 54. Talc is an ultra-fine, bright white powder stiffening filler particle 82 that reduces shrinkage and improves smoothness, abrasion resistance and temperature resistance in solidifiable epoxy, urethane and polyester filler materials 54. Commercial liquid plasticizers are well-known stiffening filler particles 82 that, when added to epoxy, urethane or polyester, increase cured toughness, resiliency and flexibility of the solidified filler materials 54.

Figure 7:
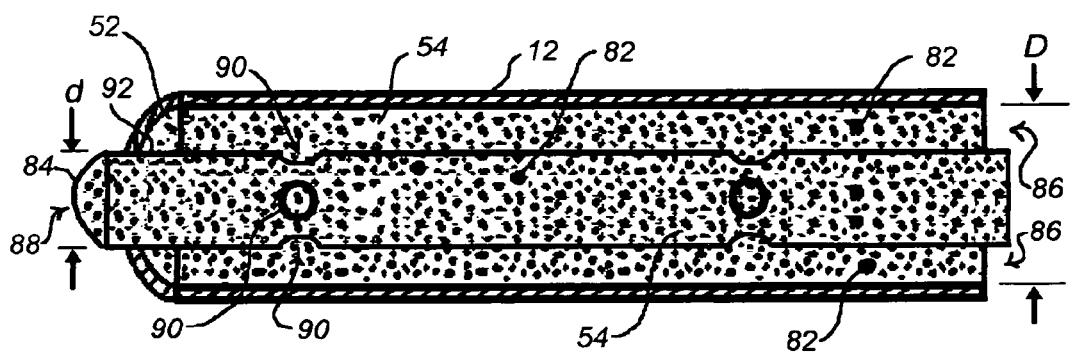
FIG. 7 illustrates another alternative embodiment of the invention illustrated in FIG. 4 having an alternative permanently bendable interior reinforcing stiffener formed of a permanently bendable rigid metal reinforcing inner stiffener tube.

FIG. 7 illustrates another alternative embodiment of the present invention having a permanently bendable rigid metal reinforcing inner stiffener tube 84 that is substituted for the permanently bendable interior rod stiffener 60 illustrated in FIG. 4. The inner stiffener tube 84 has an outer diameter d that is sized smaller than the inner diameter D of the tubular support leg 12 so that it fits inside with annular spaces 86 between the inner stiffener tube 84 and the interior cavity wall surfaces. The inner stiffener tube 84 is operated as reinforcement bars similarly to the permanently bendable stiffener rods 60 to further stiffen the structure and ensure integrity in the unlikely event the solidified material 54 fails. Accordingly, the inner stiffener tubes 84 are expected to be inserted into the permanently bendable tubular support legs 12 prior to bending and are bent concurrently with the tubular support leg 12. The resulting bent inner stiffener tube 84 generally mimics the corresponding bent and straight portions 20, 22 of the tubular support leg 12. Alternatively, a straight or slightly bent inner stiffener tube 84 is inserted into the previously bent tubular support leg 12, as described above for a tubular support leg 12 having minimal bends. Thereafter, a sufficient quantity of the solidifiable filler material 54 is flowed, pumped, injected or otherwise provided within the interior cavity of the bent tubular support leg 12 to substantially fill the annular space 86 between the inner stiffener tube 84 and the wall surfaces of the interior cavity 52. The inner stiffener tube 84 both reinforces the bent tubular support leg 12 and reduces the volume of the interior cavity that is filled with the solidifiable filler material 54 so that less is used of a more expensive solidifiable liquid filler material 54. When the solidifiable filler material 54 includes adhesive properties, it adheres the bent inner stiffener tube 84 to the wall surfaces of the interior cavity 52 of the bent tubular support leg 12.

According to one embodiment of the present invention, the a sufficient quantity of the solidifiable filler material 54 is flowed, pumped, injected or otherwise provided within the interior cavity 52 to substantially fill an tubular interior cavity 88 of the inner stiffener tube 84.

According to another embodiment of the present invention, one or more holes or "windows" 90 are provided at regular intervals through the wall 92 of the inner stiffener tube 84. During filling the windows 90 permit the solidifiable liquid filler material 54 to freely flow between the inner tube's tubular interior cavity 88 and the annular space 86 between the inner stiffener tube 84 and wall surfaces of the interior cavity 52. The solidified filler material 54 in the windows 90 mechanically couples, i.e., interlocks, the inner stiffener tube 84 with the bent tubular support legs 12.

Figure 8:
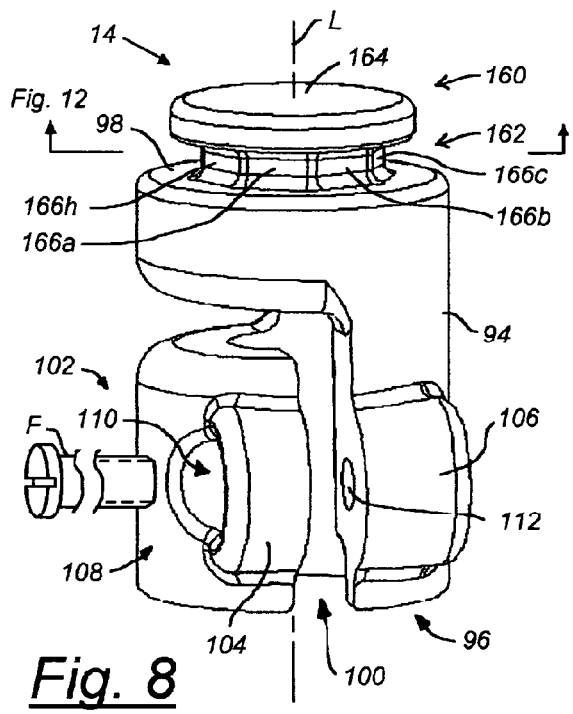
FIG. 8 is a detailed view of the multiply positionable mounting platform of the invention shown in FIG. 1 embodied as a cylindrical female collar sized to slip over an end portion of the support leg, as illustrated in FIG. 4, and is further split by a lengthwise opening and secured by a threaded side closure sized to slip over an end portion of the support leg, as illustrated in FIG. 4.

FIG. 8 is a detailed view of the multiply positionable mounting platform 14 shown in FIG. 1, which is a cylindrical female collar 94 forming therein a truncated internal cylindrical cavity 96 with a closed base 98. The truncated cylindrical cavity 96 is sized to slip over the second short lengthwise end portion 26 of the support leg 12, as illustrated in FIG. 4. The cylindrical female collar 94 is split substantially parallel with its longitudinal axis L, whereby a longitudinal opening 100 is formed. A threaded side closure 102 is provided by a pair of bosses 104, 106 operating as a coupling means 108. One boss 104 is pierced with a fastener clearance aperture 110, while the other boss 106 is provided with an internally threaded aperture 112 that is substantially aligned with the fastener clearance aperture 110. A threaded fastener F operating between the fastener clearance aperture 110 and the internally threaded aperture 112 closes the longitudinal opening 100 by drawing together the bosses 104, 106 of the threaded side closure 102, which tightens the cylindrical cavity 96 about the second short lengthwise end portion 26 of the support leg 12 and thereby operates as the coupling means 108.

Figure 9:
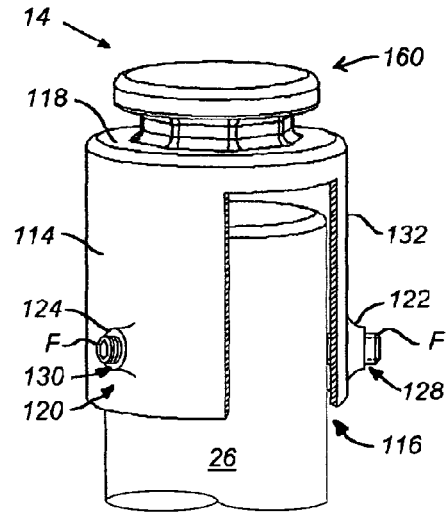
FIG. 9 illustrates one alternative embodiment of the multiply positionable mounting platform of the invention having an alternative closed tubular female collar sized to slip over the end portion of the support leg, as illustrated in FIG. 4, and is further provided with one or more set screws spaced around the periphery of the collar.

FIG. 9 illustrates one alternative embodiment of the multiply positionable mounting platform 14 having an alternative closed tubular female collar 114 forming therein a truncated internal cylindrical cavity 116 with a closed base 118. The truncated cylindrical cavity 116 is sized to slip over the second short lengthwise end portion 26 of the support leg 12. A coupling means 120 is provide by one or more threaded fasteners F or set screws operating through one or more bosses 122, 124 at one or more positions spaced around the periphery of the tubular female collar 114. Respective internally threaded apertures 128, 130 pierce the one or more bosses 122, 124 and the adjacent of a side wall 132 of the tubular female collar 114. When the side wall 132 is sufficiently thick, the bosses 122, 124 are optionally eliminated, and the threaded apertures 128, 130 pierce the side wall 132 directly. One or more of the threaded fasteners F operating through the internally threaded apertures 128, 130 engage the second short lengthwise end portion 26 of the support leg 12 and thereby operates as the coupling means 120.

Figure 10:
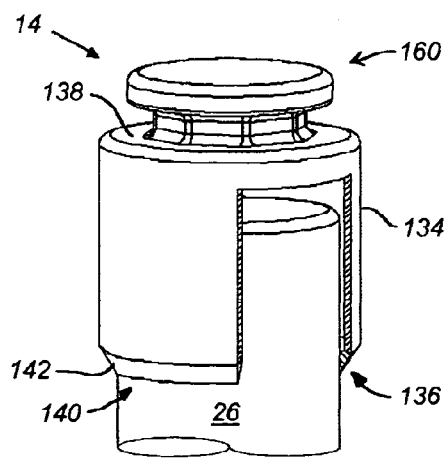
FIG. 10 illustrates another alternative embodiment of the multiply positionable mounting platform of the invention having an alternative closed tubular female collar sized to slip over the end portion of the support leg, as illustrated in FIG. 4, and the collar is secured by a weld or other fusion joint.

FIG. 10 illustrates the multiply positionable mounting platform 14 according to another embodiment of the invention. Accordingly, the multiply positionable mounting platform 14 is formed of a an alternative closed tubular female collar 134 forming therein a truncated internal cylindrical cavity 136 with a closed base 138. The truncated cylindrical cavity 136 is sized to slip over the second short lengthwise end portion 26 of the support leg 12. A coupling means 140 is provided by a weld or other fusion joint 142 formed at least intermittently between the end portion 26 of the support leg 12 and the tubular female collar 134.

Figure 11:
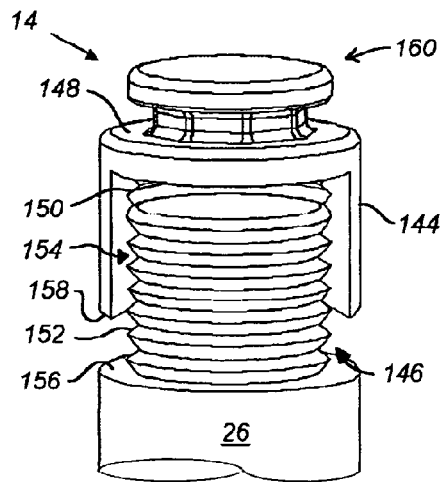
FIG. 11 illustrates another alternative embodiment of the multiply positionable mounting platform of the invention having an alternative closed tubular female collar sized to slip over the end portion of the support leg, as illustrated in FIG. 4, and the collar is secured by a threaded joint.

FIG. 11 illustrates the multiply positionable mounting platform 14 according to another embodiment of the invention, whereby the multiply positionable mounting platform 14 is formed of a an alternative closed tubular female collar 144 forming therein a truncated internal cylindrical cavity 146 with a closed base 148. The truncated cylindrical cavity 146 is provided with internal threads 150 structured to match external threads 152 provided on the second short lengthwise end portion 26 of the support leg 12. The matching internal and external threads 150, 152 cooperate to provide a threaded joint that operates as a coupling means 154 between the end portion 26 of the support leg 12 and the tubular female collar 144 of the multiply positionable mounting platform 14. The end portion 26 of the support leg 12 is oversized relative to the threads 152 such that a shoulder 156 is provided on the surface of the end portion 26. The shoulder 156 operates as a stop against which a lip 158 opening into the cylindrical cavity 146 of the tubular female collar 144 is seated when the internal threads 150 and external threads 152 are fully engaged.

FIGS. 8, 9, 10 and 11 all provide detailed side view illustrations of the multiply positionable mounting platform 14 that is illustrated in FIG. 1 as a disc-shaped button or wheel portion mounted at the end of a stem or axle portion projected from a cylindrical body of the type disclosed by Carnevali in U.S. Pat. No. 6,561,476, entitled "POSITIVELY-POSITIONABLE MOUNTING APPARATUS," the complete disclosure of which is incorporated herein by reference.

Figure 12:
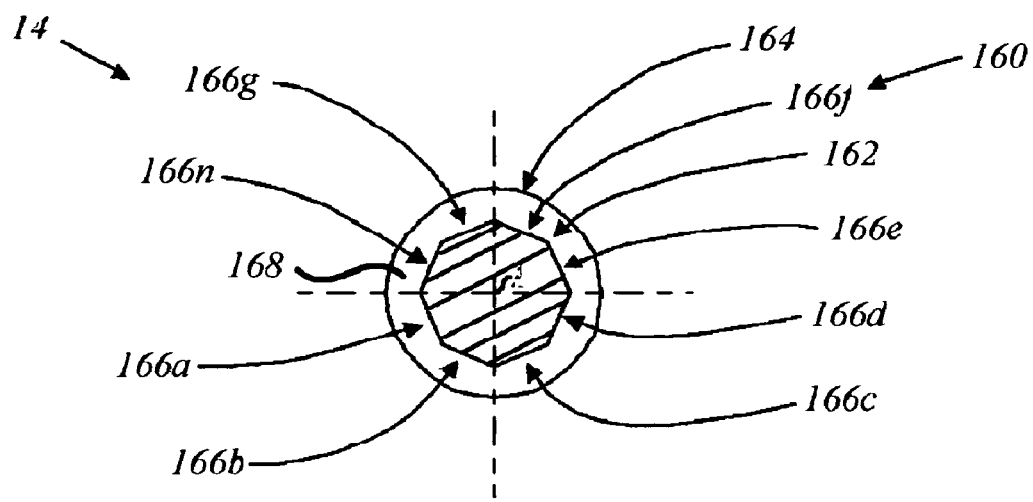
FIG. 12 is a cross-sectional view taken through the multiply positionable mounting platform that is illustrated in FIGS. 8 through 11.

FIG. 12 is a cross-sectional view taken through the multiply positionable mounting platform 14 that is illustrated in FIGS. 8 through 11. The multiply positionable mounting platform 14 accordingly is, by example and without limitation, a positively-positionable wheel-and-axle mounting platform 160 formed on the outer surface of the closed base 98 of the cylindrical female collar 94 shown in FIG. 8 (or closed base 118 of alternative closed tubular female collar 114 shown in FIG. 9, closed base 138 of alternative closed tubular female collar 134 shown in FIG. 10, or closed base 148 of alternative closed tubular female collar 144 shown in FIG. 11). With reference to FIG. 8, the mounting platform 160 is shaped like a mushroom, including a multisided stem or axle portion 162 and with a disc-shaped button or wheel portion 164 mounted at one end. The axle portion 162 projects from the outer surface of the closed base 98 opposite from the truncated cylindrical cavity 96 formed in the cylindrical female collar 94. The mounting base 98 and the positively-positionable wheel-and-axle mounting platform 160 projecting from it are formed integrally with the collar 94 of a relatively rigid material, such as a metal or hard plastic. Alternatively, some or all of the collar 94, the axle portion 162, and the wheel portion 164 are formed as discrete units and joined together at a later manufacturing stage.

According to one embodiment of the invention, the axle portion 162 is formed with a convex polygon shape, having multiple flat or planar surfaces 166*a*, 166*b*, 166*c* through 166*n*. The axle portion 162 is long enough to ensure that a portion of each of the arm members 170 and 172 of a coupler C portion of the attaching means M (described below) can obtain a suitable grip between the wheel portion 164 and the outer surface of the closed base 98 of the collar 94. The disc-shaped wheel portion 164 is sufficiently thick to support at least a minimum predetermined load applied to the coupler C of the attaching means M.

FIG. 12 is a cross-section view taken through the multisided axle portion 162 of the positively-positionable wheel-and-axle mounting platform 160. Each of the multiple surfaces 166*a* through 166*n* is rotated at substantially the same angle relative to the adjacent surfaces on either side, the angles summing to 360 degrees. According to the exemplary embodiment illustrated, the axle portion 162 has a convex polygon-shape that includes eight adjacent surfaces 166*a-h*. Other equivalent embodiments of the invention optionally include more or less adjacent surfaces 166*a-n*. However, the adjacent surfaces 166*a-n* are sufficiently small in number to ensure positive positioning without slipping relative to the portions of the operatively juxtaposed convex polygon-shaped socket sections of the arm members 170 and 172 which are structured to fit around the convex polygon-shaped axle portion 162. Such positive positioning is ensured primarily by a length of each of the surfaces 166*a-n* that is significant relative to the thickness of the multisided axle portion 162. Accordingly, the number of adjacent surfaces 166*a-n* is in the range of about three or four to as many as about a dozen or more.

FIG. 12 also shows an underside 168 of the disc-shaped wheel portion 164 in relation to the axle portion 162. The wheel portion 164 is formed substantially concentric with the axle portion 162, such that the two portions 162 and 164 share a common longitudinal axis A. The disc-shaped wheel portion 164 has a sufficiently large diameter relative to the thickness of the axle portion 162 to ensure that a portion of each of the arm members 170 and 172 of the coupler C can obtain a suitable grip to support a minimum predetermined load applied to the coupler C of the attaching means M.

Figure 13:
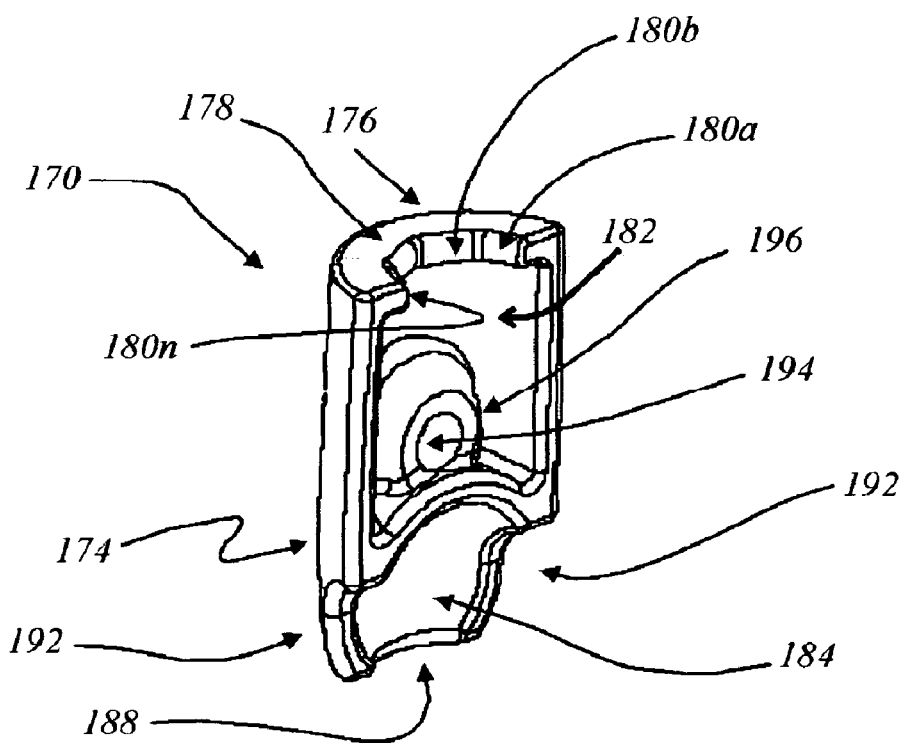
FIG. 13 illustrates one embodiment of one of two relatively rigid arm members of a coupler portion of an attaching means provided on one end of the support leg, as illustrated in FIG. 1.

FIG. 13 illustrates one embodiment of one of two relatively rigid arm members 170 and 172 of which the coupler C of the attaching means M is formed, as disclosed in U.S. Pat. No. 6,561,476, which is incorporated herein by reference. The other arm member 172 is formed similarly to the described arm member 170. The arm members 170 and 172 are formed of a relatively rigid material, such as a metal or hard plastic. The arm member 170 is formed as a short rod 174, which is optionally hollow except for its functional features. One functional feature is a convex polygon-shaped aperture 176 formed in an end face 178 of the rod 174. The convex polygon-shaped aperture 176 is provided by multiple substantially planar interior wall surfaces 180*a* through 180*n* that are formed substantially perpendicularly to the end face 178. The wall surfaces 180*a* through 180*n* are formed to mate with the planar surfaces 166*a*, 166*b*, 166*c* through 166*n* of the axle portion 162 of the positively-positionable wheel-and-axle mounting platform 160. Thus, each wall surface 180*a* through 180*n* is rotated from the adjacent wall surfaces at an angle substantially equal to that of the angles between the planar surfaces 166*a* through 166*n* of the axle portion 162.

The end portion 178 of the arm member 170 is formed with a thickness that is at least slightly less than the length of the planar surfaces 166a through 166n of the axle portion 162, both of which are formed with sufficient length or thickness to ensure that the end face 178 of each of the arm members 170 and 172 can support a minimum predetermined load applied to the coupler C portion of the attaching means M. An interior portion 182 of the arm member 170 is hollowed out under the end face 178 to provide a space large enough to accept the disc-shaped wheel portion 164 of the wheel-and-axle assembly 160. Thus, the end face 178 fits in the gap between the mounting base 98 and the disc-shaped wheel portion 164 of the wheel-and-axle assembly 160. The matching sizes, shapes, and angles between the interior wall surfaces 180a through 180n exterior axle surfaces 166a through 166n permit the axle portion 162 to nest within the shaped aperture 176 of the arm member 170 in each of several consecutive positively locking positions.

Figure 14:
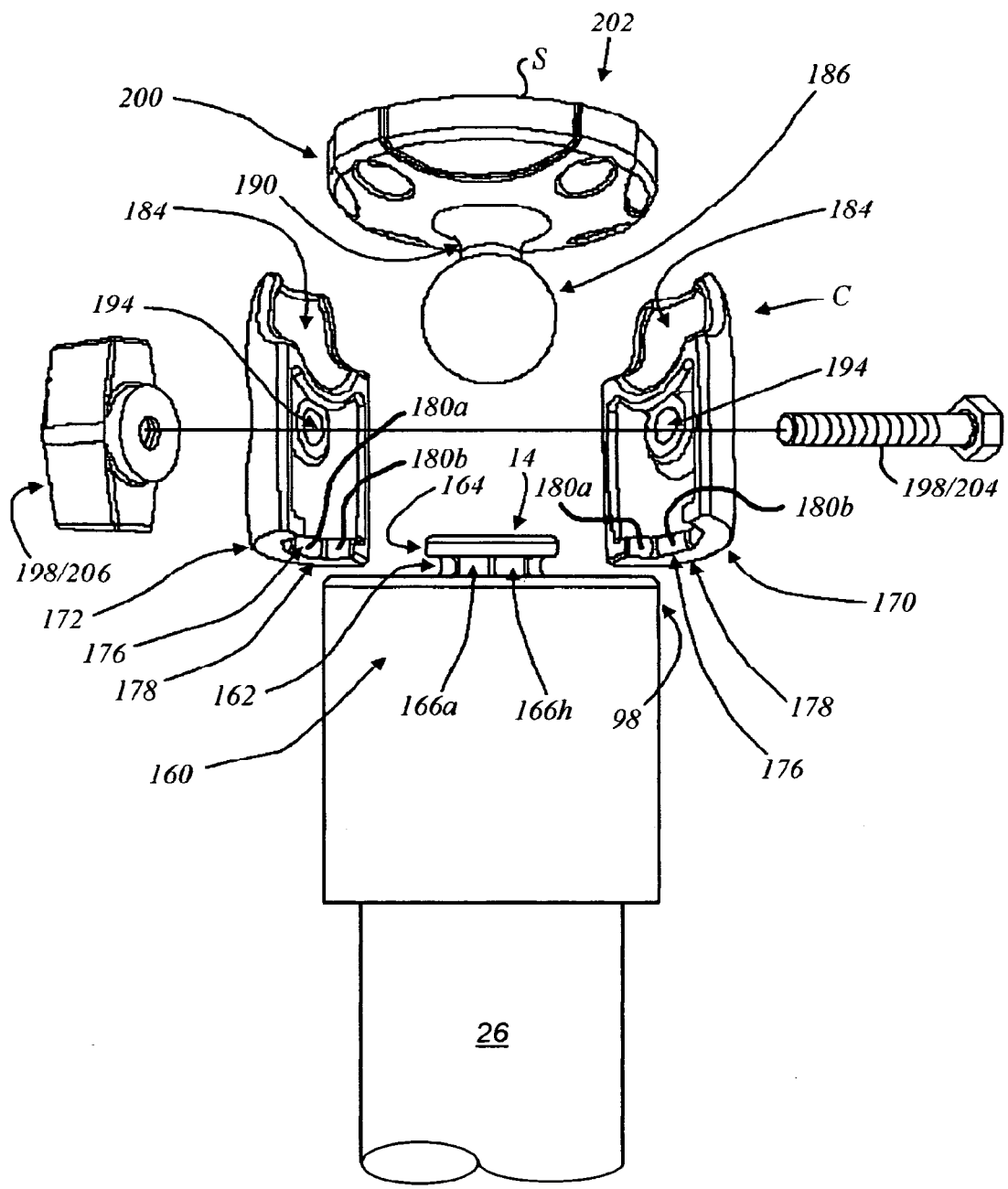
FIG. 14 illustrates one embodiment of a ball mount by which objects are securely and fixedly mounted relative to a fixed surface by the multiply configurable support and multiply positionable mounting platform apparatus of the invention, and FIG. 14 further illustrates assembly of the multiply positionable mounting platform of the invention according to the positively-positionable wheel-and-axle mounting platform embodiment of the invention.

Another functional feature is a socket-shaped cavity 184 formed at the other end of the rod 174 distal from the end face 178. The socket-shaped cavity 184 is formed with a substantially smooth, part hemispherical inner peripheral surface approximately the same diameter as a pressure deformable ball mount 186 of the type disclosed by Carnevali in U.S. Pat. No. 5,845,885, which is incorporated herein by reference. A sector or portion of the part hemispherical socket-shaped cavity 184 at the end face of the arm member 170 is removed, for example, in a plane cutting perpendicular to the length of the rod 174. The arm member 170 thus has a generally hemicircular opening 188 in the end face opposite from the end face 178. The diameter of the hemicircular opening 188 is large enough to accept a columnar rod 190 connecting the ball mount 186 to a mounting base 200, as illustrated in FIG. 14. According to one embodiment of the invention, the hemicircular opening 188 in the end face opposite from the end face 178 of the arm members 170 and 172 is large enough relative to the columnar rod 190 to permit the ball mount 186 to rotate into different angular positions relative to the arm members 170 and 172 when assembled into the coupler C of the attaching means M, as illustrated in FIG. 1.

According to one embodiment of the invention, the part hemispherical socket-shaped cavity 184 optionally includes one or more relief or cut-out 192. The one or more reliefs 192 are shown in FIG. 14 at the opposite extents of the part hemispherical socket-shaped cavity 184. Thus structured, the reliefs 192 in one arm member 170 cooperate with corresponding reliefs 192 in the other arm member 172 to provide side openings in the socket large enough to permit entry of the columnar rod 190. Thus, the cooperating reliefs 192 in the two arm members 170 and 172 expand the original conical range of motion of the coupler C of the attaching means M relative to the ball mount 186 into a fan-shaped section, as disclosed in U.S. Pat. No. 6,561,476, which is incorporated herein by reference. According to one embodiment of the invention, the cooperating reliefs 192 permit the coupler portion C of the attaching means M to rotate within the fan-shaped section as much as +/−90 degrees or more relative to the ball mount 186.

According to one embodiment of the invention, each of the arm members 170 and 172 is also formed with an aperture 194 sized to pass a shoulder bolt or another equivalent threaded fastener, as described in FIG. 14. The aperture 194 is optionally surrounded by a shoulder or boss 196 that helps support the clamping force applied by a threaded clamp assembly 198 when the arm members 170 and 172 are secured together.

FIG. 14 illustrates one embodiment of the ball mount 186 by which objects are securely and fixedly mounted relative to a fixed surface by the multiply configurable support and multiply positionable mounting platform apparatus 10 of the invention. As disclosed by Carnevali in U.S. Pat. No. 5,845,885, which is incorporated herein by reference, the ball mount 186 is formed on the cylindrical columnar rod 190 projecting from the mounting base 200. The ball mount 186, rod 190 and mounting base 200 together form a ball mount assembly 202 wherein the mounting base 200 is formed with the substantially planar mounting surface S opposite from the ball mount 186 and rod 190 for permanently attaching an external instrument or device using either mechanical fasteners or an adhesive bond, as discussed herein. The ball mount 186 is a substantially smooth, part spherical-shaped member formed of a pressure deformable, resilient elastomeric material, which renders part spherical the ball mount 186 relatively radially compressible. The ball mount 186 is structured for attachment of an external device. The pressure deformable material of which the ball mount 186 is composed permits its part-spherical shape to be deformed to conform to the internal contours of the arm members 170 and 172 when sufficient compressive pressure is applied. The pressure is applied by the threaded clamp assembly 198. The resilient nature of the material causes it to resume its original part spherically-shaped configuration when the clamp assembly 198 is released, whereby the compressive pressure is removed.

Assembly and Operation

FIG. 14 illustrates assembly of the multiply positionable mounting platform 14 according to the positively-positionable wheel-and-axle mounting platform embodiment 160 of the invention. Accordingly, the coupler portion C of the attaching means M is simultaneously assembled with the ball mount 186 at one end and the positively-positionable wheel-and-axle mounting platform 160 at the opposite end. The pair of rigid arm members 170 and 172 of the coupler C are secured together by the threaded clamp assembly 198 embodied, for example, a threaded shoulder bolt 204 and a wing nut 206 that combine to form the threaded clamp assembly 198, as illustrated in FIG. 1. Alternatively, the clamp assembly 198 is formed with either a cam or another over-center clamp (not shown) that may include means, such as threaded means, for adjusting the clamping pressure exerted upon the rigid arm members 170 and 172.

During assembly, the pair of rigid arm members 170 and 172 are operatively juxtaposed to simultaneously form one socket section structured to fit securely around the ball mount 186 and another socket section provided by the pair of convex polygon-shaped apertures 176 structured to fit securely around the positively-positionable wheel-and-axle mounting platform 160. The bolt 204 and nut 206 clamp the arm members 170 and 172 securely around both the ball mount 186 and the positively-positionable wheel-and-axle mounting platform 160 in any of a variety of relative rotational orientations. The ball mount 186 can be oriented anywhere within a conical zone or a fan-shaped zone, and can be rotated throughout a full 360 degrees about the longitudinal axis L of the of the ball mount 186 and the cylindrical female collar 94. Simultaneously, the coupler portion C of the attaching means M can be oriented in a fixed orientation with the positively-positionable wheel-and-axle mounting platform 160 in one of several rotationally consecutive positively locking positions.

The convex polygon-shaped apertures 176 of the pair of operatively juxtaposed rigid arm members 170 and 172 cooperate to form a convex polygon-shaped collar around the positively-positionable wheel-and-axle mounting platform 160 of the multiply positionable mounting platform 14 at one end of the coupler C. The multiply positionable mounting platform 14 is one of the several different embodiments disclosed herein or another equivalent embodiment. The planar surfaces 166*a* through 166*n* of the axle portion 162 coordinate with the planar wall surfaces 180*a* through 180*n* of the shaped apertures 176 to orient the coupler portion C of the attaching means M in any of the several rotationally relative positively locking positions. While the axle portion 162 is nested within the shaped apertures 176, the disc-shaped wheel portion 164 is fitted within the hollowed out socket portion 182 of the arm members 170 and 172 and captured behind the end face 178.

The socket-shaped cavities 184 of the pair of operatively juxtaposed rigid arm members 170 and 172 also coordinate to form a collar around the ball mount 186 at the other end of the coupler C. The columnar rod 190 between the ball mount 186 and the mounting base 200 cooperates with the generally circular openings 188 in the pair of arm members 170 and 172 to orient the coupler portion C of the attaching means M in any of the several relative locking positions within conical or fan-shaped zones.

The operatively juxtaposed rigid arm members 170 and 172 are clamped together by the bolt 204 passing through the respective apertures 194 and threading the nut 206 onto the bolt 204. Clamping pressure is applied by tightening the head of bolt 204 and face of the nut 206 against outer surfaces of the respective arm members 170 and 172. The clamping pressure can thus be applied in stages. Applying the clamping pressure in stages causes the operative portions of the positively-positionable wheel-and-socket structure 160 of the multiply positionable mounting platform 14 to become substantially fixed or locked in one relative rotational position, while the operative portions of the ball-and-socket structure remain loose and, therefore, relatively adjustable. The partially applied clamping pressure causes the multiple flat or planar surfaces 166*a* through 166*n* of the axle portion 162 of the positively-positionable wheel-and-socket structure 160 to nest with the corresponding planar wall surfaces 180*a* through 180*n* of the shaped apertures 176. The partially applied clamping pressure thus securely orients the coupler portion C of the attaching means M relative to the female collar 94 and the support leg 12.

Continued tightening of the nut 206 onto the bolt 204 increases the applied clamping pressure. The increased clamping pressure brings the inner peripheral surfaces of the socket-shaped cavities 184 into snug contact with the pressure deformable ball mount 186, such that motion of the coupler C relative to the mounting base 200 of the ball mount assembly 202 becomes more difficult. When forced together across the pressure deformable ball mount 186 by tightening the nut 206 onto the bolt 204, the inner peripheral surfaces of the part hemispherical socket-shaped cavities 184 are forced closer together than the unconstrained diameter of the deformable ball mount 186. Firmly tightening the nut 206 onto the bolt 204 applies sufficient clamping pressure between the cooperating socket-shaped cavities 184 and the pressure deformable ball mount 186 to deform the normally spherical shape of the ball mount 186. The coupler portion C of the attaching means M thus interlocks the ball mount 186 in a relative angular orientation with the arm members 170 and 172 by conforming the pressure deformable ball mount 186 to the inner peripheral surfaces of the socket-shaped cavities 184. The firmly applied clamping pressure thus securely orients the coupler C relative to the mounting base 200 of the ball mount assembly 202. Thus deformed, the ball mount 186 is substantially immovably secured relative to the socket-shaped cavities 184 and the coupler portion C of the attaching means M.

Upon partial release of the clamping force, the ball mount 186 resiliently resumes its original part spherical-shaped configuration. In such uncompressed and part spherical condition, the ball mount 186 is again angularly and rotationally rotatable relative to the mating concavely-shaped socket surfaces 184 of the arm members 170 and 172. The ball mount 186 is optionally angularly and/or rotationally rotated to a different orientation relative to the coupler portion C of the attaching means M. The pressure is again applied by the clamp assembly 198 to the ball mount 186. The pressure again relatively radially compresses the pressure deformable elastomeric material into a shape that mates with the inner peripheral surfaces of the socket-shaped cavities 184. The ball mount 186 and the attached mounting base 200 are thereby again locked in a fixed angular and rotational orientation with the coupler C.

Alternative Embodiments

FIG. 3 illustrates one alternative embodiment of the mounting apparatus 10 of the invention wherein the mounting platform 14 of the invention is replaced by a fixed position platform pressure deformable ball mount 210 of the type disclosed by Carnevali in U.S. Pat. No. 5,845,885, which is incorporated herein by reference. The ball mount 210 is formed on a cylindrical rod 212 projecting from a tubular female collar 214. The ball mount 210, rod 212 and collar 214 together form a ball mount assembly 216. The ball mount 210 is a substantially smooth, part spherical-shaped member formed of a pressure deformable, resilient elastomeric material, which renders part spherical the ball mount 210 relatively radially compressible, as disclosed in U.S. Pat. No. 5,845,885, which is incorporated herein by reference. The pressure deformable material of which the ball mount 210 is composed permits its part-spherical shape to be deformed to conform to the internal contours of the arm members 170 and 172 when sufficient compressive pressure is applied. The pressure is applied by the clamp assembly 198. The resilient nature of the material causes it to resume its original part spherically-shaped configuration when the clamp assembly 198 is released and the compressive pressure is removed. The ball mount 210 is thus structured for attachment of an external device, as disclosed in above incorporated U.S. Pat. No. 5,845,885. Accordingly, an appropriate split arm assembly of the type disclosed by Carnevali in U.S. Pat. No. 5,845,885 is used to grip the ball mount 210 and thereby mount and position an external instrument or other device, for example, by using a second ball mount assembly 216 coupled to a mounting surface of the external instrument or other device.

The female collar 214 from which the ball mount 210 projects is constructed according to any of the previously described embodiments of the multiply positionable mounting platform 14 of the invention. For example, the female collar 214 is constructed as described for the cylindrical female collar 94 of FIG. 8 having the truncated cylindrical cavity 96 with a closed base 98 having the ball mount 210 projected therefrom and the threaded side closure 102 operating as the coupling means 108.

In another example, the female collar 214 is constructed as described for the alternative closed tubular female collar 114 of the type described in FIG. 9 having a truncated cylindrical cavity 116 with the ball mount 210 projected from the closed base 118, with the coupling means 120 being provided by the set screws or other threaded fasteners F.

In still another example, the female collar 214 is constructed as described for the alternative closed tubular female collar 134 of the type described in FIG. 10 having the truncated cylindrical cavity 136 with the ball mount 210 projected from the closed base 138, with the coupling means 140 provided by the weld or other fusion joint 142.

Alternatively, the female collar 214 is constructed as described for the alternative internally threaded collar 144 of the type illustrated in FIG. 11 forming therein the truncated cylindrical cavity 146 with a closed base 148. The female collar 214 includes the truncated internal cylindrical cavity 146 formed with the internal threads 150, as shown in FIG. 11, that are structured to match the external threads 152 on the second short lengthwise end portion 26 of the support leg 12. The matching internal and external threads 150, 152 cooperate to provide the threaded joint that operates as the coupling means 154 between the end portion 26 of the support leg 12 and the tubular female collar 214. The end portion 26 of the support leg 12 is oversized relative to the threads 152 such that the shoulder 156 is provided on the surface of the end portion 26 and operating as a stop against which the lip 158 of the tubular female collar 144 is seated when the internal threads 150 and external threads 152 are fully engaged.

According to one embodiment of the invention, the female collar 214 is constructed as an internally threaded collar of the type disclosed by Carnevali in co-pending U.S. patent application Ser. No. 10/862,688 entitled, "CONFIGURABLE MOUNTING BRACKET," filed in the name of Jeffrey D. Carnevali on Jun. 7, 2004, which is incorporated herein by reference, having means for turning and applying torque 218 that is embodied, by example and without limitation, as a square or hexagonal (shown) base sized for accepting a standard-sized US or metric wrench, whereby torque is applied to secure the threaded collar 214 relative to the threaded end portion 26 of the support leg 12.

FIG. 1 illustrates the support base 16 embodied as having a fastener slot as the means for securing it to an external surface. However, the securing means is alternatively embodied as the round mounting base 200 illustrated in FIG. 3 having either the apertures 226, or the resilient adhesive PSA pad as means for securing the mounting apparatus 10 relative to an external surface, such as a floor of an automobile or other vehicle.

FIG. 1 also illustrates the multiply positionable mounting platform 14 having its attaching means M embodied as the coupler C gripping the pressure deformable ball mount 186. A substantially planar mounting surface S for permanently attaching an external instrument or device. As illustrated in FIG. 1, the ball mount 186 is mounted on a mounting base 230 having a pair of flanges 232, 234 each being optionally structured with one or more apertures 236 that operate as mounting holes by which the external instrument or device to be supported (not shown) is permanently mounted by means of one or more mounting screws (not shown) to the mounting surface "S" on the top side of the mounting base 230 opposite from the ball mount 186 and the multiply configurable mounting apparatus 10. The apertures 236 are optionally formed with countersinks or counter-bores to accommodate the heads of the mounting screws. According to other embodiments of the invention, the mounting surface S is supplied with an adhesively bondable surface, or a PSA.

According to one or more different embodiments of the invention, the mounting base 230 is optionally embodied having a peripheral flange similar to the embodiment of the round mounting base 200 illustrated by example and without limitation in FIG. 3.

As discussed in detail herein, the support rod 12 is securely fixed to the multiply positionable mounting platform 14 which is structured with means for permanently attaching an external device or instrument thereto, such as a portable desk or laptop computer, cellular telephone, personal digital assistant (PDA), global positioning system (GPS) navigation device, or another electronic or even mechanical device to conduct business on the road, vacation, or even conduct everyday business. The external device or instrument being mounted either directly or through an intermediary mounting device, for example, of the type described by Carnevali, the inventor of the present invention, in U.S. Pat. No. 5,845,885, issued Dec. 8, 1998, entitled "UNIVERSALLY POSITIONABLE MOUNTING DEVICE," which is incorporated herein by reference.

FIG. 15 illustrates another alternative embodiment of the mounting platform apparatus 10 of the invention having the shoe-type support base 16 installed on the opposite second short lengthwise end portion 26 in substitution for the mounting platform 14. Accordingly, the mounting platform apparatus 10 of the invention presents the second shoe-type support base 16 as a fixed position universal mounting platform that is optionally rotationally orientable relative to the support leg 12. For example, when the second shoe-type support base 16 is attached using set screws F as gripping means 32 for gripping the second end portion 26 of the support leg 12, the foot portion 34 is rotatably re-orientable by loosening and retightening the set screws F. Furthermore, the shoe-type support base 16 permits the mounting platform apparatus 10 to present the flat sole portion 38 of the foot 34 as an embodiment of the planar mounting surface S to which an external device is secured using a mechanical fastener with fixing means 36. Once installed on the end portion 26 of the support leg 12, the flat sole portion 38 of the second shoe-type support base 16 is easily orientable by means of permanently bending the support leg 12, as discussed herein.

FIG. 16 illustrates another alternative embodiment of the mounting platform apparatus 10 of the invention having a flanged mounting platform 220 of the type illustrated in FIG. 3 installed on the opposite second short lengthwise end portion 26 as substitution for the multiply positionable mounting platform 14. Accordingly, the mounting platform apparatus 10 of the invention presents the flanged mounting platform 220 as a fixed position universal mounting platform having substantially planar mounting surface 44 that provides the substantially planar mounting surface S opposite from the main body of the support leg 12. The flanged mounting platform 220 is optionally rotationally orientable relative to the support leg 12. For example, when the flanged mounting platform 220 is attached using set screws F through the tubular boss 48 as gripping means 32 for gripping the second end portion 26 of the support leg 12, as discussed herein, the peripheral flange 46 is optionally rotatably re-orientable by loosening and retightening the set screws F. Alternatively, the flanged mounting platform 220 is optionally rotationally fixed relative to the support leg 12 when the means 32 for gripping the second end portion 26 of the support leg 12 is a fusion joint, as discussed herein.

Furthermore, the flanged mounting platform 220 permits the mounting platform apparatus 10 to present the for securing an external device using a mechanical fastener operated through multiple apertures 50. The multiple apertures 50 are thus embodied as clearance holes for mounting screws (not shown) used to secure an external device, such as a cradle, to the flanged mounting platform 220. The apertures 50 are optionally formed with countersinks or counter-bores to accommodate the heads of the mounting screws. According to other embodiments of the invention, the substantially planar mounting surface 44 is supplied with an adhesively bondable surface, or a resilient adhesive pad 51 of the type shown in FIG. 3 applied between the mounting surface 44 and the device to be attached thereto.

According to different embodiments of the invention, the gripping means 32 for gripping the second end portion 26 of the support leg 12 is, for example, one of the gripping means 32 or coupling means 108, 120, 140 and 154, as described herein. For example, the gripping means 32 is: the one or more threaded fasteners F or set screws applied to threaded apertures, as illustrated in FIG. 1; the threaded side closure 102 provided by the pair of bosses 104, 106 operating as the coupling means 108, as illustrated in FIG. 8; the one or more threaded fasteners F or set screws operating through bosses 122, 124 spaced around the periphery of the collar 114 operating as the coupling means 120, as illustrated in FIG. 9; weld joint 142 formed at least intermittently between the end portion 26 of the support leg 12 and the tubular female collar 134 operating as coupling means 140, as illustrated in FIG. 10; or cooperating internal and external threads 150, 152 that provide a threaded joint that operates as a coupling means 154 between the end portion 26 of the support leg 12, as illustrated in FIG. 11.

FIG. 16 also illustrates the apparatus 10 of the invention having a collet 222 (shown in cross-section) mounted on the flanged mounting platform of the foot-type support base 16 in substitution for the tubular boss 48 by which the permanently bendable support leg 12 was attached in the embodiment of FIG. 3. The collet 222 is structured having the aperture 30 to admit for admitting the leg end portion 24 of the permanently bendable support leg 12. The collet 222 also includes conventional internally and externally threaded mating portions 224 and 226, respectively, and jaws 228 that expand and contract in response to the expansion and contraction of the mating threaded portions 224 and 226 to admit and retain the leg end portion 24. As are the threaded-type means for securing the mounting platform 14 or support base 16 to the end portion 26 of the support leg 12, as illustrated in FIGS. 8, 9, 11 and 15, the collet-type is easily loosened to permit the mounting platform 14 or support base 16 to be optionally rotationally orientable relative to the support leg 12.

The foot-type support base 16 embodied with the collet 222 is optionally used in substitution for the flanged mounting platform 220 installed on the opposite second short lengthwise end portion 26 as substitution for the multiply positionable mounting platform 14. As such, the substantially planar mounting surface 44 provides the substantially planar mounting surface S opposite from the main body of the support leg 12.

Figure 17:
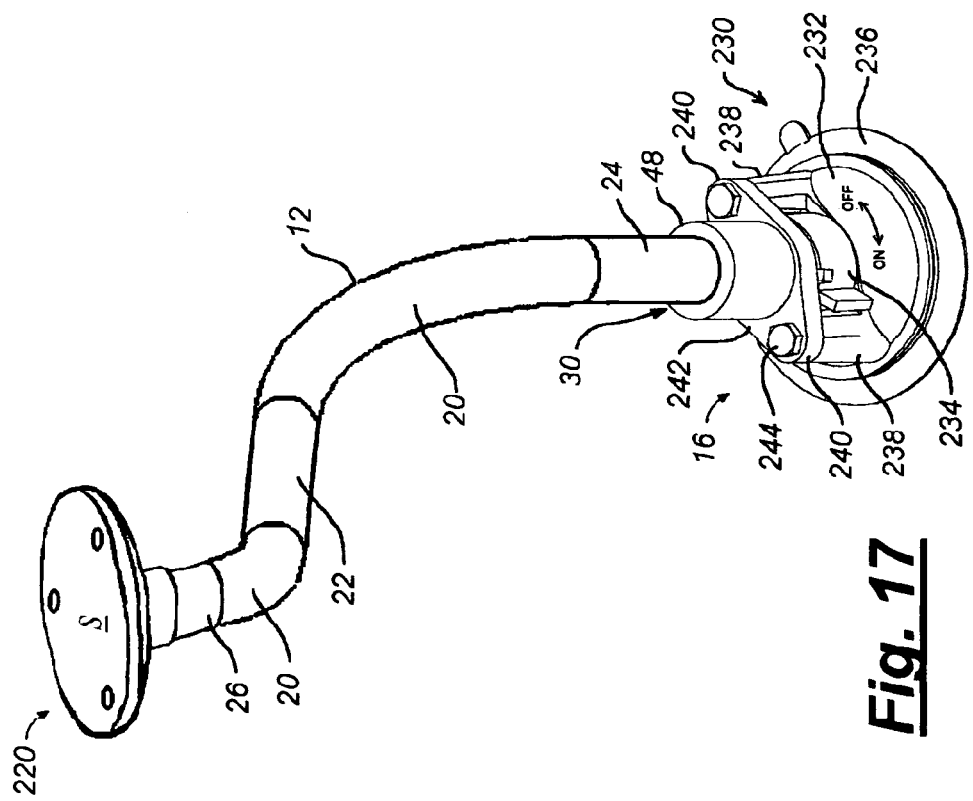
FIG. 17 illustrates the apparatus of the invention having the securing means on the base end of the support leg embodied as a suction cup device.

FIG. 17 illustrates the apparatus 10 of the invention having the support base 16 embodied as a suction cup device 230 of, by example and without limitation, the type disclosed by Carnevali in U.S. Pat. No. 6,666,420, entitled "SUCTION CUP HAVING COMPACT AXIAL INSTALLATION AND RELEASE MECHANISM," issued Dec. 23, 2003, which is incorporated herein by reference. Accordingly, the suction cup device 230 includes a housing 232 with a rotary drive 234 controlling a pliable suction cup 236. The housing 232 is provided with mounting means 238 embodied, by example and without limitation, as a pair of mounting pillars. Flanges 240 of a flanged mounting platform 242 are secured by fasteners 244 to mounting pillars 240 of the suction cup device 230. The flanged mounting platform 244 is provided with the tubular boss 48 structured having the aperture 30 for admitting the leg end portion 24 by which the permanently bendable support leg 12 is secured, as illustrated in the embodiment of FIG. 3.

Figure 18:
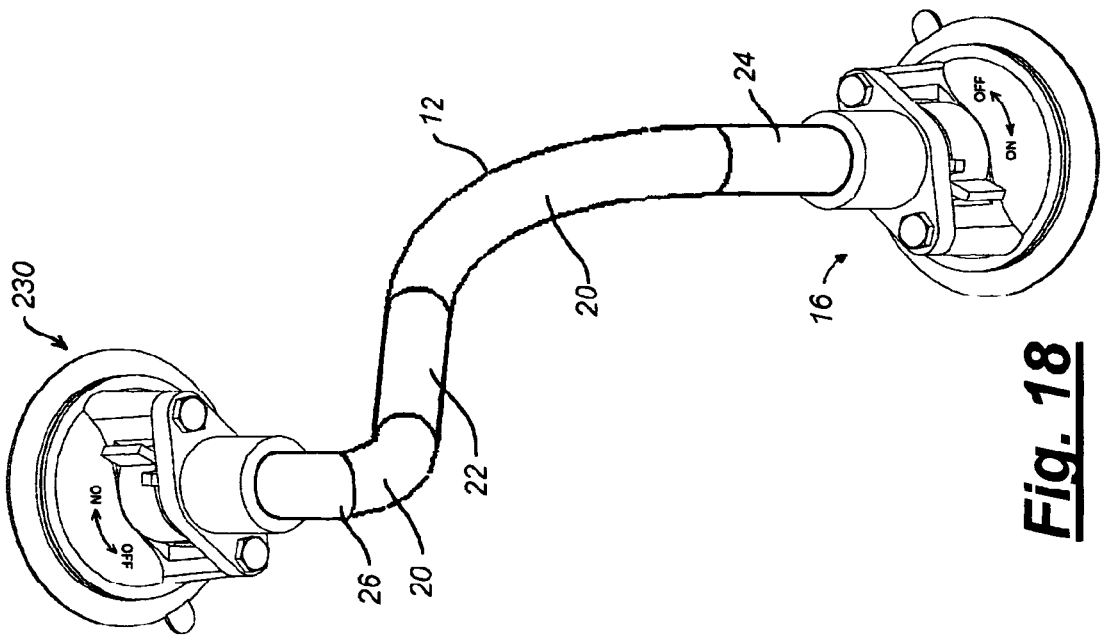
FIG. 18 illustrates an alternative embodiment of the apparatus of the invention having the suction cup device installed on both the base end of the support leg and on the opposite device mounting end as substitution for the multiply positionable mounting platform.

FIG. 18 illustrates an embodiment of the apparatus 10 of the invention having the suction cup device 230 installed on the opposite second short lengthwise end portion 26 as substitution for the multiply positionable mounting platform 14. As such, the suction cup device 230 is structured for securing relative to a fixed surface by suction any light or heavy objects having a substantially smooth planar or gently curved surface of a type suitable for coupling to a suction cup device.

Figure 19:
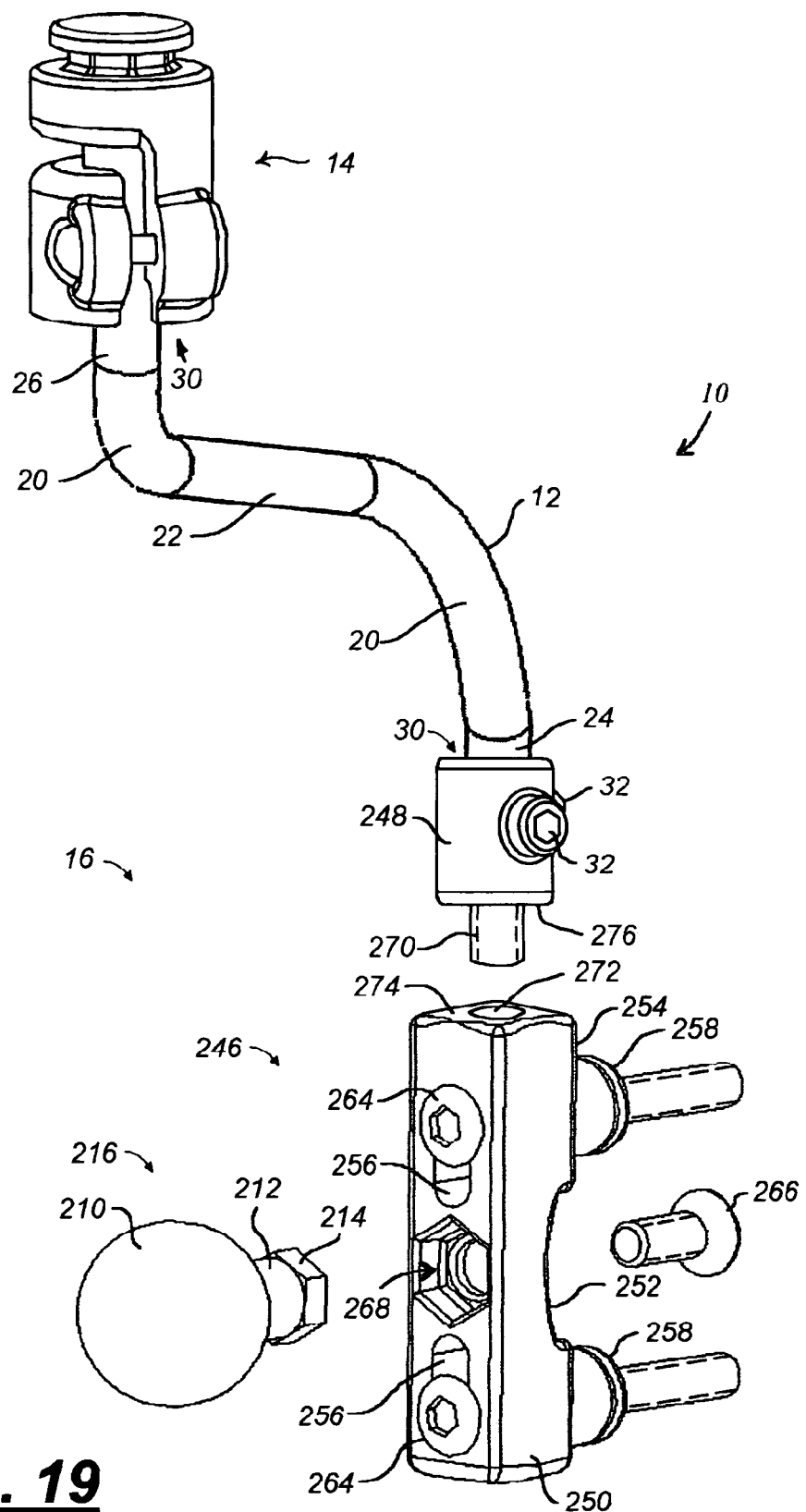
FIG. 19 illustrates an alternative embodiment of the mounting apparatus of the invention having the support base embodied as a handlebar mounting bracket assembly.

FIG. 19 illustrates an alternative embodiment of the mounting apparatus 10 of the invention having the support base 16 embodied as a handlebar mounting bracket assembly 246 of the type disclosed by Carnevali in co-pending parent U.S. patent application Ser. No. 10/802,408 entitled, "CONFIGURABLE MOUNTING BRACKET," filed in the name of Jeffrey D. Carnevali on Jun. 7, 2004, which is incorporated herein by reference. The support base 16 also includes a threaded union adapter 248 that is structured for coupling the end portion 24 of the permanently bendable support leg 12 to the mounting bracket 246. The mounting bracket 246 is a multiply configurable mounting bracket provided by a substantially rigid elongated body 250 having an arcuate handlebar groove 252 formed in one longitudinal surface 254 thereof and oriented crosswise to a longitudinal axis of the elongated body 250. A pair of elongated passages 256 is formed through the body 250 straddling the groove 252.

According to one embodiment of the invention, a pair of spacers 258 are provided, one for each of the two bolt clearance holes or slots 256. The spacers 258 are long enough to hold the body 250 away from the handlebar when another instrument or device is pre-existing on the handlebar, or to operate between the body 250 and a U-clamp 260 (shown in FIG. 22) or with a U-bolt 262 (shown in FIG. 23) for securing the handlebar-mounting bracket assembly 246 against slipping and shifting. The spacers 260 are small enough in cross-section to avoid interference both with pre-existing instruments or devices on the vehicle handlebar and straddled by the handlebar groove 252, and pre-existing objects surrounding the bracket assembly 246.

A bolt or other threaded fastener 264 operates through each of the passages 256 to attach the mounting bracket assembly 246 to an external surface. In particular, the arcuate structure renders the handlebar groove 252 suitable for either engaging a round or otherwise curved bar, such as a handlebar, or a for clearing a pre-existing instrument. For example, the threaded fasteners 264 are pre-existing mounting screws or bolts used to secure a pre-existing instrument or device on the vehicle handlebar, where the pre-existing instrument or device has a low profile in the vicinity of the mounting fasteners 264. For example, the bolt clearance holes or slots 256 are sized to straddle the pre-existing instrument or device while permitting the threaded fasteners 264 to align with mounting holes in the pre-existing instrument or device. Alternatively, the threaded fasteners 264 may be longer screws or bolts sized to replace shorter pre-existing mounting screws or bolts such that the replacement threaded fasteners 264 secure the body 250 of the bracket assembly 246 to the vehicle handlebar while simultaneously securing the pre-existing instrument or device.

A ball mount assembly 216 of the type illustrated in FIG. 3 and described herein is coupled to the body 250 opposite from the groove 252 by means of a threaded fastener 266 operating through an aperture 268 formed through the body 250 and oriented substantially crosswise to its longitudinal axis. The ball mount assembly 216 is formed of the ball mount 210, rod 212 and collar 214. The ball mount 210 is a substantially smooth, part spherical-shaped member formed of a pressure deformable, resilient elastomeric material, which renders part spherical the ball mount 210 relatively radially compressible, as disclosed in U.S. Pat. No. 5,845,885, which is incorporated herein by reference.

According to one embodiment of the invention, the threaded union adapter 248 is provided with a threaded male stud 270 sized to mate with a female thread 272 formed in one end face 274 of the elongated body 250. A shoulder 276 is formed on the union adapter 248 surrounding the stud 270 provides a stop that operates against the body end face 274. The union adapter 248 includes the cavity or aperture 30 for admitting the leg end portion 24 of the permanently bendable support leg 12, as discussed herein. The union adapter 248 also includes the gripping means 32, as discussed herein, for gripping the leg end portion 24. For example, the gripping means 32 is provided by one or more threaded fasteners F or set screws applied to an internally threaded aperture (as indicated at 32).

Figure 20:
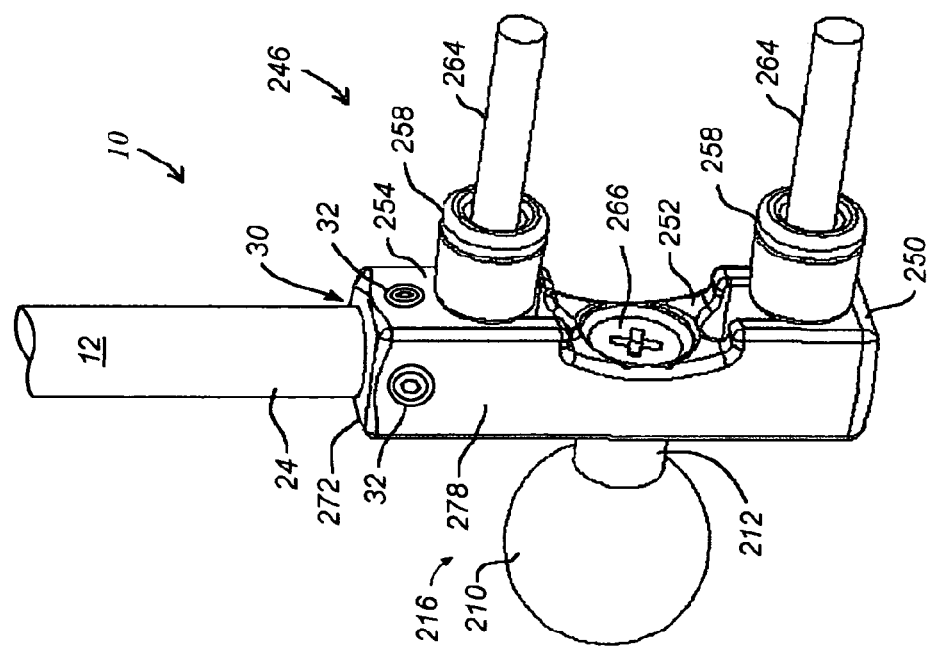
FIG. 20 illustrates an alternative embodiment of the mounting apparatus of the invention having the support base embodied as an alternative embodiment of the handlebar mounting bracket assembly illustrated in FIG. 19.

FIG. 20 illustrates an alternative embodiment of the mounting apparatus 10 of the invention having the support base 16 embodied as an alternative embodiment of the handlebar mounting bracket assembly 246 of the type disclosed by Carnevali in co-pending parent U.S. patent application Ser. No. 10/802,408, which is incorporated herein by reference, and which includes the ball mount assembly 216, as discussed herein. Accordingly, the end face 272 of the elongated mounting bracket body 250 is provided with the cavity or aperture 30 for admitting the leg end portion 24 of the permanently bendable support leg 12, as discussed herein. The gripping means 32 of the alternative mounting bracket body 250 for gripping the leg end portion 24 is provided by one or more threaded fasteners 32 or set screws applied to different internally threaded apertures distributed in different longitudinal faces 254, 278 (as indicated at 32) and oriented crosswise to a longitudinal axis of the elongated body 250.

Figure 21:
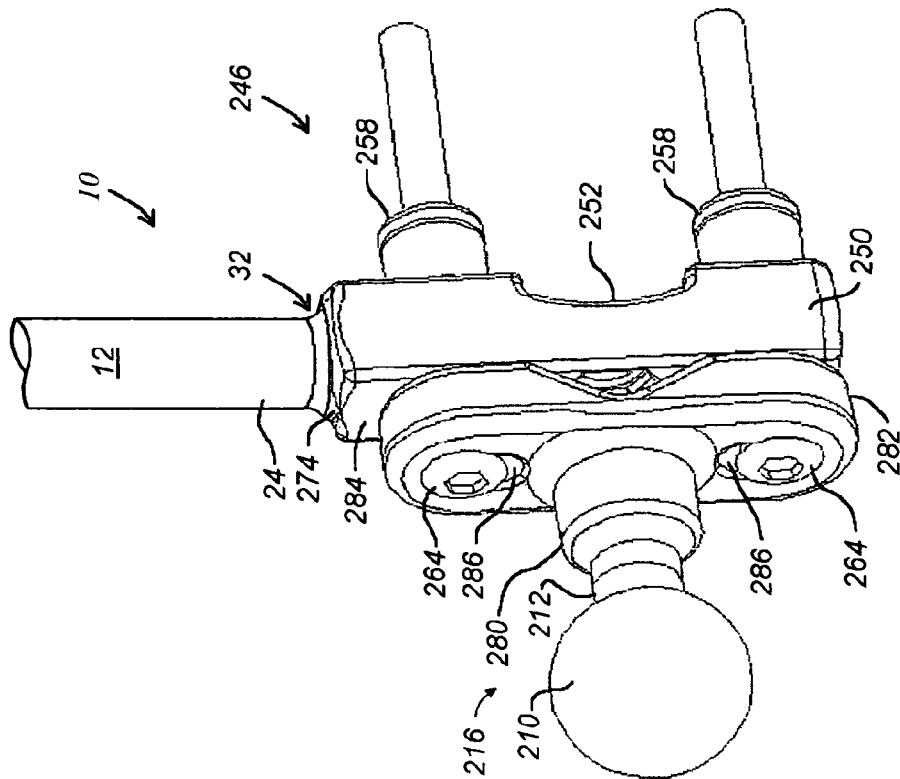
FIG. 21 illustrates an alternative embodiment of the mounting apparatus of the invention having the support base embodied as another alternative embodiment of the handlebar mounting bracket assembly illustrated in FIG. 19.

FIG. 21 illustrates an alternative embodiment of the mounting apparatus 10 of the invention having the support base 16 embodied as an alternative embodiment of the handlebar mounting bracket assembly 246 of the type disclosed by Carnevali in co-pending parent U.S. patent application Ser. No. 10/802,408, which is incorporated herein by reference, and having the ball mount assembly 216 embodied as a flanged assembly wherein the ball mount 210 coupled via the rod 212 to a boss 280 projected from a flanged base 282. The flanged base 282 of the ball mount assembly 216 is coupled to one elongated face 284 of the elongated mounting bracket body 250 by means of the bolts 264 passing through slots 286 in the flanged base 282. According to the embodiment of FIG. 21, the gripping means 32 for gripping the end portion 24 of the permanently bendable support leg 12 is embodied as a means for fusing the leg end portion 24 to the end face 274 of the elongated body 250. The gripping means 32 is provided by a conventional weld, solder or braze joint or another conventional fusion joint. Alternatively, the fusing-type leg end gripping means 32 includes conventional chemical and ultrasonic weld joints when the mounting bracket body 250 and the leg end portion 24 are formed of other suitable metal or plastic materials. According to one embodiment of the invention, the end face 274 of the mounting bracket body 250 is provided with the aperture 30 sized to admit the leg end portion 24, which increases the security of the joint while improving manufacturability.

FIG. 22 illustrates another alternative embodiment of the mounting apparatus 10 of the invention having the support base 16 embodied as another alternative embodiment of the handlebar mounting bracket assembly 246 of the type disclosed by Carnevali in co-pending parent U.S. patent application Ser. No. 10/802,408, which is incorporated herein by reference. The alternative bracket assembly 246 includes the U-clamp 260 which is fitted over the threaded fasteners 264 with a saddle portion 288 being fitted against a back surface of the vehicle handlebar opposite from the elongated mounting bracket body 250 of the apparatus 10. A pair of nuts 290 are threaded onto the respective threaded fasteners 264 to secure the apparatus 10 to the vehicle handlebar with the ball mount 210 of the assembly 216 positioned as desired on the vehicle handlebar.

In FIG. 22 the gripping means 32 for gripping the end portion 24 of the permanently bendable support leg 12 is embodied as mating male and female threads with the female thread 272 formed in the end face 274 of the elongated body 250, as described in FIG. 19, and the threaded male stud 270 formed on the end portion 24 of the permanently bendable support leg 12. The shoulder 276 is formed on the leg end portion 24 surrounding the stud 270 and provides the stop that operates against the body end face 274, as described in FIG. 19.

FIG. 23 illustrates yet another alternative embodiment of the mounting apparatus 10 of the invention having the support base 16 embodied as another alternative embodiment of the mounting bracket assembly 246 of the type disclosed by Carnevali in co-pending parent U.S. patent application Ser. No. 10/802,408, which is incorporated herein by reference. The alternative bracket assembly 246 includes the U-bolt 262 for securing the handlebar-mounting bracket assembly 246 against slipping and shifting. Accordingly, the elongated mounting bracket body 250 of the apparatus 10 is secured to the vehicle handlebar directly using the threaded U-bolt 262 and a pair of nuts 292 in place of the threaded fasteners 264.

While the preferred embodiment of the invention has been illustrated and described, it will be appreciated that various changes can be made therein without departing from the spirit and scope of the invention. For example, materials may be substituted for the different components of the multiply configurable mounting apparatus of the invention without departing from the spirit and scope of the invention. Therefore, the inventor makes the following claims.

What is claimed is:

1. A multiply configurable mounting apparatus, comprising:
   a support base configured for being fixed to an external surface, the support base comprising an ankle portion coupled adjacent to a first end of an elongated foot portion;
   a solitary permanently bendable support leg formed of a continuously solid metal having first and second end portions at opposite ends thereof, the first end portion being fixedly coupled to the ankle portion of the support base and the second end portion being structured for having an external device coupled thereto; and
   device mounting means for fixedly mounting an external device to the second end portion of the permanently bendable support leg, wherein the device mounting means further comprises:

a connector comprising a female collar forming therein an internal cavity sized to receive the second end portion of the support leg thereinto and means for retaining the support leg relative thereto, and a pair of arm members forming a socket-shaped cavity therebetween, a mounting base with a pressure deformable ball mount projected therefrom and sized to be relatively rotatably received into the socket-shaped cavity of the connector, and means for applying clamping force between the pair of arm members relative to the socket-shaped cavity formed therebetween; and wherein the anide portion of the support base further comprises an aperture formed therein sized to receive the first end portion of the support leg thereinto and means for retaining the support leg relative thereto, and the elongated foot portion thereof further comprises an aperture formed therethrough that is sized to pass a mechanical fastener.

2. The apparatus of claim 1 wherein the aperture formed in the ankle portion of the support base further comprises a substantially tubular aperture sized to receive the first end portion of the support leg thereinto in a relatively rotationally rotatable relationship therewith.

3. The apparatus of claim 2 wherein the support leg is coupled to the ankle portion of the support base by a threaded joint.

4. The apparatus of claim 3 wherein the female collar further comprises a polygonal positionable mount formed external of the internal cavity and comprising a disc-shaped wheel portion mounted on a polygonal axle portion and substantially enlarged relative thereto; and the pair of arm members further forming therebetween adjacent to an exterior surface thereof opposite from the socket-shaped cavity a polygonal aperture substantially matched to the polygonal axle portion of the polygonal positionable mount, and a space therebetween contiguous with the polygonal aperture and sized to receive the disc-shaped wheel portion.

5. The apparatus of claim 4 wherein:

the female collar further comprises a longitudinal slit in one wall between the internal cavity and an external wall surface; and the means for retaining the support leg relative thereto further comprises a threaded joint comprising a threaded side closure operating across the longitudinal slit in the wall and having a threaded fastener operable between a fastener clearance aperture formed on the external wall surface on one side of the longitudinal slit and an internally threaded aperture formed on the external wall surface on an opposite side of the longitudinal slit from the fastener clearance aperture.

6. A multiply configurable mounting apparatus, comprising:

a single elongated support leg that is formed of a permanently bendable continuously solid metal rod having opposing first and second substantially straight end portions;

device mounting means for mounting an external device positions relative to the first end portion of the support leg, the device mounting means further comprising:

a connector comprising a compressible female collar sized to receive the first end portion of the support leg thereinto, means for compressing the female collar relative to the first end portion of the support leg, and first and second substantially rigid arm members forming a substantially part-spherical socket cavity therebetween, a mounting base having a plurality of mounting apertures formed therethrough with a pressure deformable ball mount projected therefrom and sized to be relatively rotatably received into the socket cavity of the connector, and threaded means for applying clamping force between the arm members of the connector relative to the socket cavity formed therebetween; and leg securing means for securing the second end portion of the support leg relative to an external surface.

7. The apparatus of claim 6 wherein the leg securing means further comprises a substantially rigid shoe-shaped support base comprising an elongated foot portion formed with an elongated slot sized to admit a threaded fastener;

an ankle portion adjacent one end of the foot portion, the anide portion comprising an aperture sized to receive the second end portion of the support leg, and one or more threaded apertures extending between the aperture and an exterior surface of the ankle portion; and a threaded fastener matched to each of the one or more threaded apertures.

8. The apparatus of claim 6 wherein the female collar further comprises a longitudinally split tubular aperture sized to admit the first end portion of the support leg in a relatively rotationally rotatable relationship therewith, and the means for compressing the female collar relative to the first end portion of the support leg further comprises a threaded closure operable across the split in the tubular aperture.

9. The mounting bracket of claim 8 wherein the pressure deformable ball mount further comprises a substantially smooth, part spherical-shaped ball mount formed of a resiliently pressure deformable elastomeric materials;

the mounting base further comprises a substantially planar mounting surface opposite from the ball mount, the connector further comprises a polygonal axle opposite from the tubular aperture, and a wheel portion sized larger around than the polygonal axle and mounted at an end of the axle distal from the support leg;

each of the arm members formed with:

(a) a part hemispherical socket adjacent a first end, the socket sized to conform to the ball mount, and (b) a polygonal part collar adjacent a second end, the part collar structured to conform to the polygonal axle of the positively-positionable mount; and the threaded means for applying clamping force further comprising a clamp assembly structured to secure together the pair of relatively rigid arm members in an operatively juxtaposed configuration with the part hemispherical sockets cooperating with the ball mount to form a positionable ball-and-socket assembly, and simultaneously the polygonal part collars cooperating with the polygonal positively-positionable mount to form a positively-positionable wheel-and-axle assembly.

10. A mounting apparatus, comprising:

a single elongated substantially cylindrical support leg formed of a continuously solid and permanently bendable metal rod having opposing first and second substantially straight end portions;

a slotted shoe mechanism coupled to the first straight end portion of the support leg, the shoe mechanism comprising:

an ankle portion formed with a substantially cylindrical aperture sized to receive the first straight end portion of the support leg and being relatively rotationally rotatable there about, and a plurality of threaded apertures extending between the aperture and an exterior surface of the ankle portion, a foot portion that is coupled to the ankle portion and structured with an elongated slot for securing the mounting apparatus relative to an external surface, and a threaded fastener matched to each of the plurality of threaded apertures; and a mounting platform comprising:

a female collar having an internal cavity structured to be coupled to the second straight end portion of the support leg and being truncated by a closed base, and a platform structured on the closed base of the female collar, the platform being structured for coupling an external device thereto.

11. The apparatus of claim 10 wherein the platform further comprises:

a polygonal axle portion projected from an outer surface of the closed base opposite from the truncated cavity, and a relatively larger wheel portion formed at one end of the axle portion distal from the closed base.

12. The apparatus of claim 11, further comprising a split arm assembly comprising first and second relatively rigid arm members and a clamp structured to secure together the arm members in an operatively juxtaposed configuration, each of the arm members being formed with a polygonal part collar adjacent a first end, the polygonal part collar of each of the arm members being structured to cooperate with the polygonal axle portion to form a positively-positionable wheel-and-axle assembly.

13. The apparatus of claim 12, further comprising a ball mount assembly comprising a radially compressible ball mounted on a mounting base; and wherein the split arm assembly further comprises a socket structured to cooperate with the ball of the ball mount assembly to form a securely positionable ball-and-socket assembly, each of the first and second relatively rigid arm members further comprising a part hemispherical socket adjacent to a second end opposite from the split arm assembly part collar.

* * * * *